US012739676B2

(12) United States Patent
Ibrahim et al.

(10) Patent No.: US 12,739,676 B2
(45) Date of Patent: Sep. 15, 2026

(54) L1 ACTIVATION AND ADAPTATION OF L2 CLI REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Seyedkianoush Hosseini, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 950 days.

(21) Appl. No.: 17/816,289

(22) Filed: Jul. 29, 2022

(65) Prior Publication Data

US 2024/0049022 A1 Feb. 8, 2024

(51) Int. Cl.
*H04W 24/10* (2009.01)
*H04W 72/04* (2023.01)
*H04W 72/23* (2023.01)

(52) U.S. Cl.
CPC ........... *H04W 24/10* (2013.01); *H04W 72/23* (2023.01)

(58) Field of Classification Search
CPC ............... H04W 24/10; H04W 72/042; H04W 72/541–542; H04W 72/11; H04W 72/24
See application file for complete search history.

(56) References Cited

U.S. PATENT DOCUMENTS

| | | | | |
|---|---|---|---|---|
| 11,968,555 | B2 * | 4/2024 | Lee | H04W 24/10 |
| 2019/0149305 | A1 * | 5/2019 | Zhou | H04L 5/0092 370/330 |
| 2020/0228213 | A1 * | 7/2020 | Masal | H04B 17/345 |
| 2020/0266908 | A1 * | 8/2020 | Qian | H04L 5/0094 |
| 2021/0067991 | A1 * | 3/2021 | Zhu | H04W 8/24 |
| 2022/0086843 | A1 * | 3/2022 | Ying | H04W 72/0446 |
| 2022/0329360 | A1 * | 10/2022 | Lee | H04W 72/1273 |
| 2022/0386156 | A1 * | 12/2022 | Park | H04W 24/10 |
| 2024/0155596 | A1 * | 5/2024 | Ganesan | H04B 7/0623 |
| 2024/0236736 | A1 * | 7/2024 | Oh | H04W 8/22 |
| 2024/0237047 | A1 * | 7/2024 | Kazmi | H04L 47/623 |
| 2024/0407037 | A1 * | 12/2024 | Matsumura | H04B 7/06968 |
| 2025/0344086 | A1 * | 11/2025 | Shim | H04J 11/0026 |

FOREIGN PATENT DOCUMENTS

| | | |
|---|---|---|
| WO | 2021101285 A1 | 5/2021 |
| WO | 2021183612 A1 | 9/2021 |
| WO | 2022010572 A1 | 1/2022 |

OTHER PUBLICATIONS

International Search Report and Written Opinion—PCT/US2023/026005—ISA/EPO—Oct. 11, 2023.

(Continued)

*Primary Examiner* — Romani Ohri
(74) *Attorney, Agent, or Firm* — Procopio, Cory, Hargreaves & Savitch LLP

(57) ABSTRACT

A method for wireless communication at a UE is disclosed herein. The method includes receiving DCI for activating MAC-CE CLI reporting. The method further includes transmitting one or more MAC-CE CLI reports based upon the DCI.

30 Claims, 20 Drawing Sheets

(56) References Cited

OTHER PUBLICATIONS

Mediatek Inc: "Enhancement on Multi-Beam Operation", 3GPP TSG RAN WG1 #104b-e, R1-2102675, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177680, 34 Pages, sections 2.1-2.3, figures 5,6, pp. 27-29, paragraph [2.2.1].

Qualcomm Incorporated: "On Potential Enhancements on Dynamic/Flexible TDD", 3GPP TSG RAN WG1, Meeting #112bis-e, R1-2303590, 3rd Generation Partnership Project, Mobile Competence Centre, 650, Route Des Lucioles, F-06921 Sophia-Antipolis Cedex, France, vol. 3GPP RAN 1, No. Online, Apr. 17, 2023-Apr. 26, 2023, Apr. 7, 2023, XP052294150, 42 pages, paragraph [5.5.1].

* cited by examiner

400
Self-Interference from DL to UL
Interference from BS
Uplink
Downlink
Interference to UE 1
402a
404a
406a
408a
UE 1
UE 2
410
Downlink
Uplink
Interference to UE 1
Downlink
402b
404b
406b
408b
UE 1
UE 2
Self-Interference from UL to DL
420
Uplink
Downlink
Interference to UE 1
402c
404c
406c
408c
UE 1
UE 2
Self-Interference from UL to DL Aperiodic Trigger States 810

Aperiodic Trigger State 808

Report Id x 812A

Report Id y 812B

Configured DCI Codepoint Set 806

Active DCI Codepoints 806A

807

1 n n+1

Sc

Inactive DCI Codepoints 806B

Associated with C-RNTI

DCI 802

CSI Request Field 804

Other Fields 814

800

900

Associated with SP-CSI RNTI

DCI 902

CSI Request Field 904

Other Fields 912

DCI Codepoints 906

1 n

907 n+1

Sc

SP Trigger States 909

SP Trigger State 908

Report Id 910

2000

2002

2010

CU Processor 2012

Report Receiving Component 199

Memory 2012'

Memory 2014

Communications Interface 2018

Midhaul Link

2030

DU Processor 2032

Report Receiving Component 199

Memory 2032'

Memory 2034

Communications Interface 2038

Fronthaul Link

2040

RU Processor 2042

Report Receiving Component 199

Memory 2042'

Memory 2044

Transceiver(s) 2046

Antennas 2080

Communications Interface 2048

104

L1 ACTIVATION AND ADAPTATION OF L2 CLI REPORTING

TECHNICAL FIELD

The present disclosure relates generally to communication systems, and more particularly, to interference measurement reporting by a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus is configured to receive downlink control information (DCI) for activating medium access control element (MAC-CE) crosslink interference (CLI) reporting; and transmit one or more MAC-CE CLI reports based upon the DCI.

In an aspect of the disclosure, a method, a computer-readable medium, and an apparatus are provided for wireless communication at a network node. The apparatus is configured to transmit downlink control information (DCI) for activating medium access control element (MAC-CE) cross-link interference (CLI) reporting; and receiving one or more MAC-CE CLI reports based upon the DCI.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
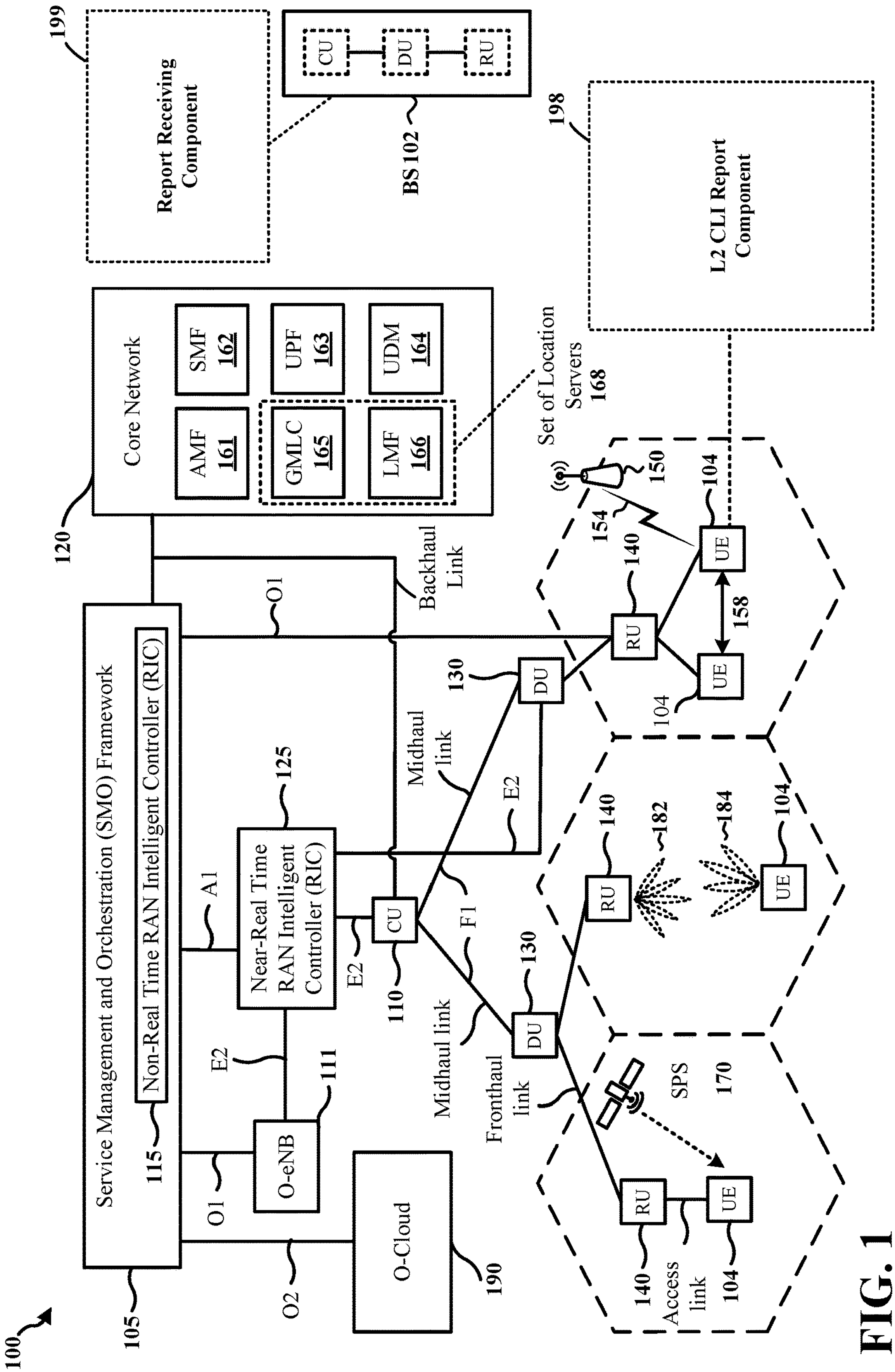
FIG. 1 is a diagram illustrating an example of a wireless communications system and an access network.

A first UE (e.g., an interfered UE) may experience CLI from a second UE (e.g., an interfering UE) when the first UE transmits and receives data on the same frequency band. CLI may impact communications reliability at the first UE. Aspects presented herein provide for efficient triggering of CLI reporting by a UE such that a base station and/or the UE can adjust transmission/reception parameters to mitigate the effect of CLI. To provide such efficiency, layer 1 (L1) (e.g., DCI-based) activation and deactivation of layer 2 (L2) (MAC-CE) based CLI reporting is disclosed herein. In an example, a UE receives DCI for activating MAC-CE CLI reporting. The UE transmits one or more MAC-CE CLI reports based upon the DCI. As the MAC-CE CLI reporting is triggered by DCI, the activation of the MAC-CE CLI reporting may be faster in comparison to activation of MAC-CE CLI reporting by L2 signaling. As the UE may be able to more rapidly transmit MAC-CE CLI reports to a base station via activation of the MAC-CE CLI reporting by the DCI, the base station and/or the UE may be able to more rapidly adjust transmission/reception parameters to mitigate the effect of CLI.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS (e.g., a gNB), 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term “sub-6 GHz” or the like if used herein may broadly represent frequencies that may be less than 6 GHz, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figures 2A, 2B, 2C, 2D:
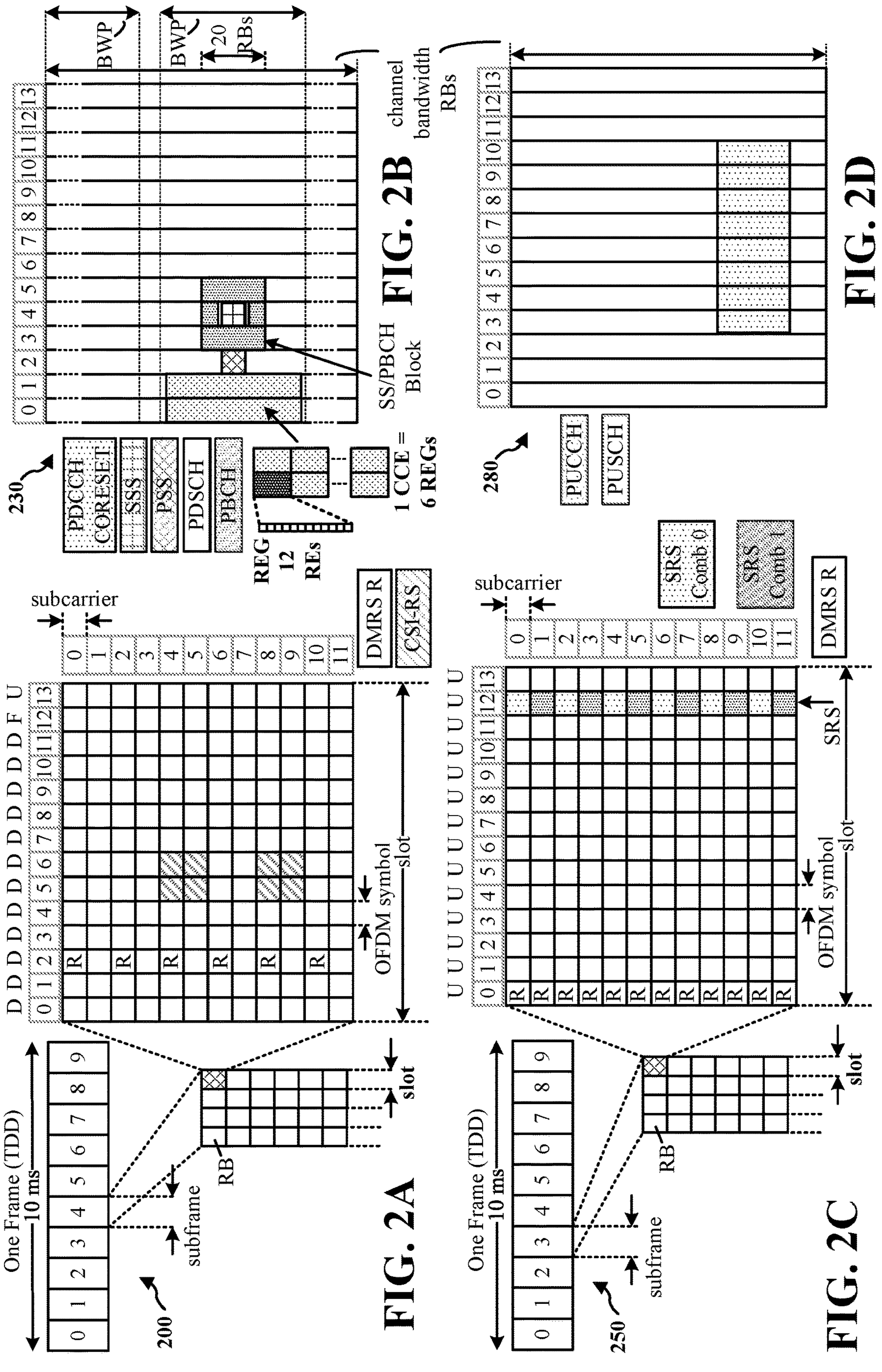
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

Referring again to FIG. 1, in certain aspects, the UE 104 may include an L2 CLI report component 198 that is configured to receive DCI for activating MAC-CE CLI reporting and to transmit one or more MAC-CE CLI reports based upon the DCI. In certain aspects, the base station 102 may include a report receiving component 199 that is configured to transmit DCI for activating MAC-CE CLI reporting and to receive one or more MAC-CE CLI reports based upon the DCI. Although the following description may be focused on 5G NR, the concepts described herein may be applicable to other similar areas, such as LTE, LTE-A, CDMA, GSM, and other wireless technologies, FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
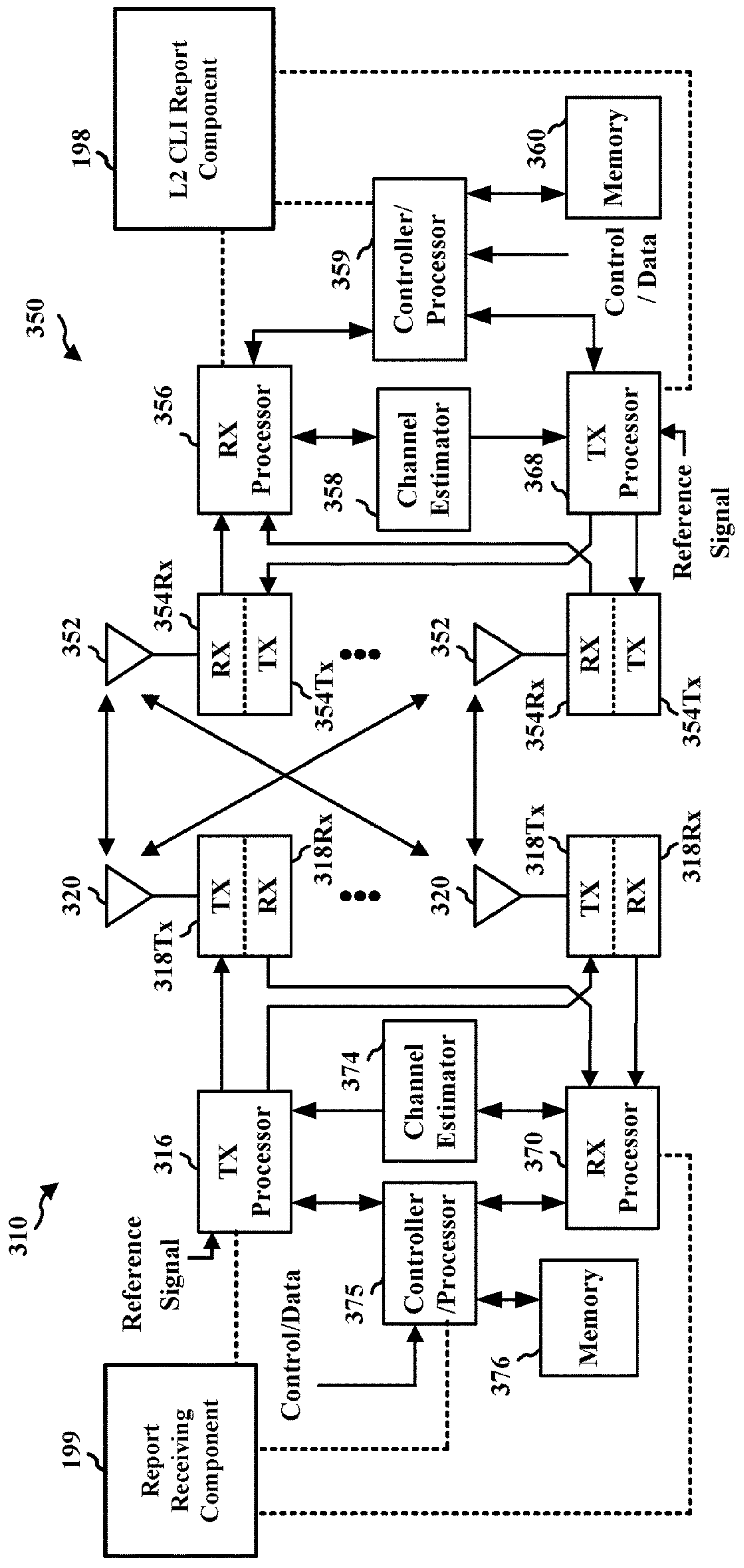
FIG. 3 is a diagram illustrating an example of a base station and UE in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the L2 CLI report component 198 of FIG. 1.

At least one of the TX processor 316, the RX processor 370, and the controller/processor 375 may be configured to perform aspects in connection with the report receiving component 199 of FIG. 1.

Figure 4A:
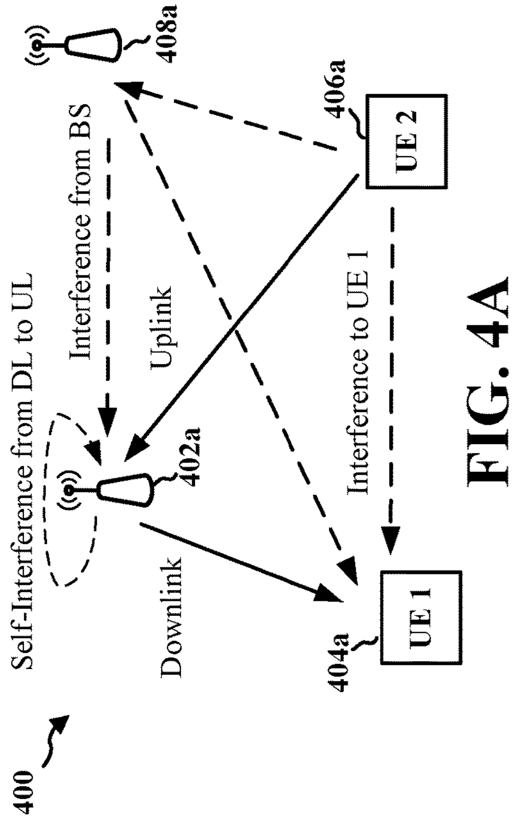
FIGS. 4A, 4B, and 4C illustrate example diagrams of full duplex wireless communication.
Figure 4C:
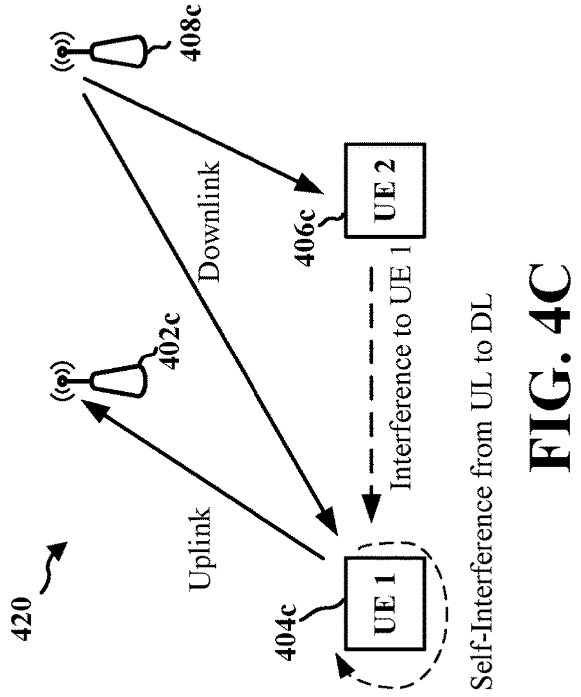
Figure 4B:
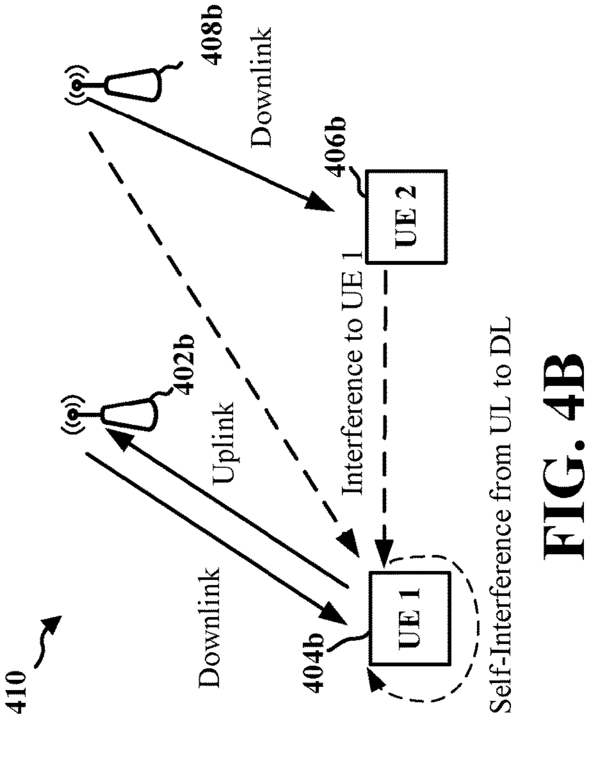

FIGS. 4A-4C illustrate various modes of full duplex communication. Full duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station (sometimes referred to as CLI). Such interference (e.g., self-interference or interference caused by other devices) may impact the quality of the communication, or even lead to a loss of information.

FIG. 4A shows a first example of full duplex communication 400 in which a first base station 402*a* is in full duplex communication with a first UE 404*a* and a second UE 406*a*. The first UE 404*a* and the second UE 406*a* may be configured for half-duplex communication or full-duplex communication. FIG. 4A illustrates the first UE 404*a* performing downlink reception, and the second UE 406*a* performing uplink transmission. The second UE 406*a* may transmit a first uplink signal to the first base station 402*a* as well as to other base stations, such as a second base station 408*a* in proximity to the second UE 406*a*. The first base station 402*a* transmits a downlink signal to the first UE 404*a* concurrently (e.g., overlapping at least partially in time) with receiving the uplink signal from the second UE 406*a*. The first base station 402*a* may experience self-interference at its receiving antenna that is receiving the uplink signal from the second UE 406*a*, the self-interference being due to reception of at least part of the downlink signal transmitted to the first UE 404*a*. The first base station 402*a* may experience additional interference (e.g., CLI) due to signals from the second base station 408*a*. Interference may also occur at the first UE 404*a* based on signals from the second base station 408*a* as well as from uplink signals from the second UE 406*a* (e.g., CLI).

FIG. 4B shows a second example of full-duplex communication 410 in which a first base station 402*b* is in full-duplex communication with a first UE 404*b*. In this example, the first UE 404*b* is also operating in a full-duplex mode. The first base station 402*b* and the first UE 404*b* receive and transmit communication that overlaps in time and is in a same frequency band. The base station and the UE may each experience self-interference, due to a transmitted signal from the device leaking to (e.g., being received by) a receiver at the same device. The first UE 404*b* may experience additional interference (e.g., CLI) based on one or more signals emitted from a second UE 406*b* and/or a second base station 408*b* in proximity to the first UE 404*b*.

FIG. 4C shows a third example of full-duplex communication 420 in which a first UE 404*c* transmits and receives full-duplex communication with a first base station 402*c* and a second base station 408*c*. The first base station 402*c* and the second base station 408*c* may serve as multiple transmission and reception points (multi-TRPs) for UL and DL communication with the first UE 404*c*. The second base station 408*c* may also exchange communication with a second UE 406*c*. In FIG. 4C, the first UE 404*c* may transmit an uplink signal to the first base station 402*c* that overlaps in time with receiving a downlink signal from the second base station 408*c*. The first UE 404*c* may experience self-interference as a result of receiving at least a portion of the first signal when receiving the second signal, e.g., the UE's uplink signal to the first base station 402*c* may leak to (e.g., be received by) the UE's receiver when the UE is attempting to receive the signal from the second base station 408*c*. The first UE 404*c* may experience additional interference (e.g., CLI) from the second UE 406*c*.

Figure 5:
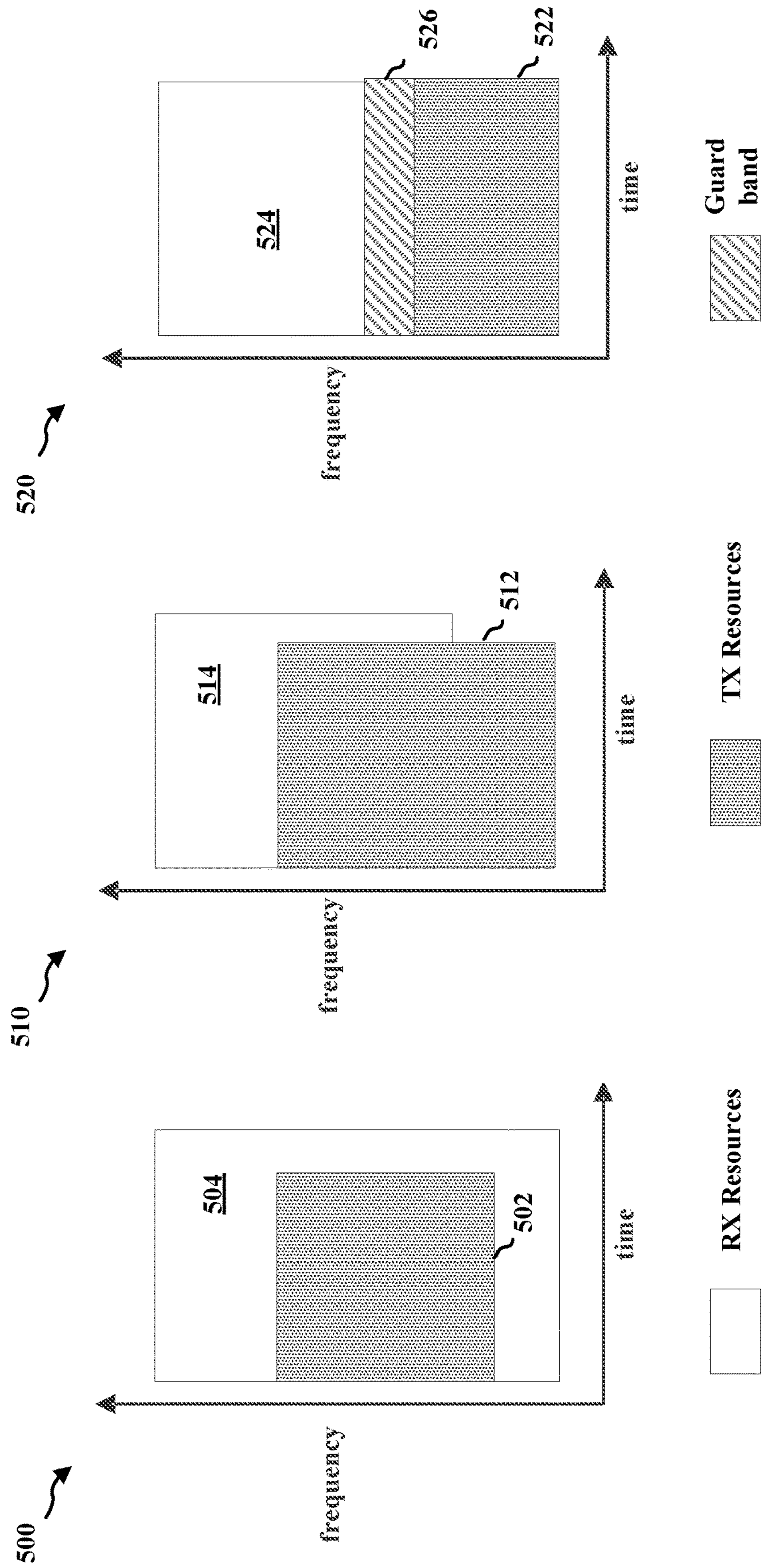
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency sub-bands, in the same frequency sub-band, or in partially overlapping frequency sub-bands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

Figure 6:
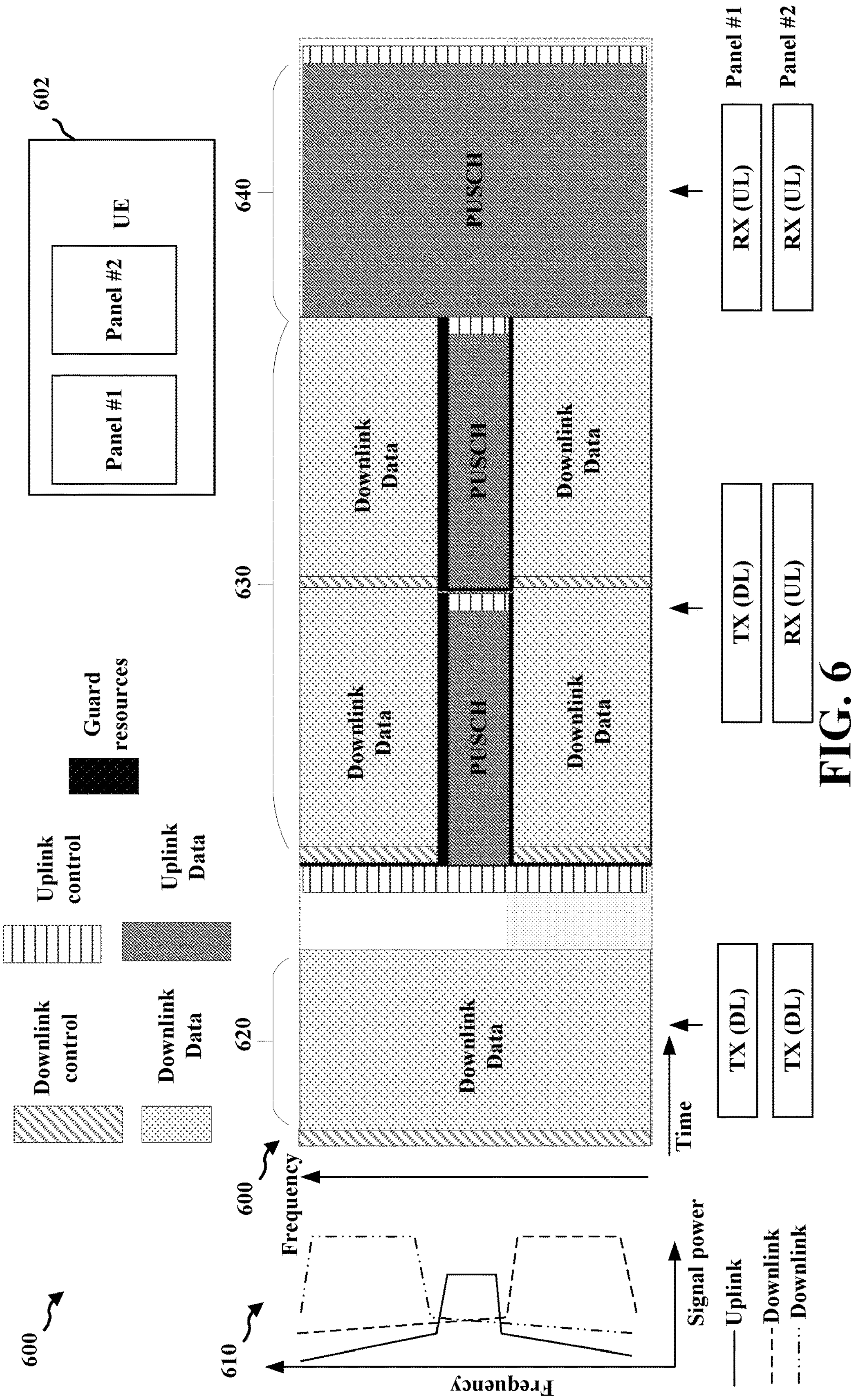
FIG. 6 illustrates an example set of time and frequency resources that include both half duplex and full duplex periods.

FIG. 6 illustrates an example device 602 that includes separate panels, e.g., antenna panels, for simultaneous transmission and reception in full-duplex operation. For example, the device 602 is illustrated as including panel #1 and panel

#2. In some examples, panel #1 may be for downlink transmission. The downlink transmission may be at both edges of a frequency band, such as illustrated in 600 and 610. Panel #2 may be for uplink reception, such as using frequency resources within a frequency band, such as at a middle of the frequency band. Sub-band full duplex operation, such as described in connection with FIG. 5 may be associated with an isolation of greater than 40 dB. As shown in FIG. 5, the downlink and uplink resources may be in different portions of a frequency band with a guard band between the uplink and downlink portions of the frequency band. FIG. 6 illustrates an example set of time and frequency resources 600 that include both half duplex and full duplex periods. For example, the period of time 620 includes half duplex resources for downlink data, e.g., panel #1 and panel #2 may both receive downlink data during the period of time 620. The period of time 620 includes sub-band full-duplex resources for uplink transmissions (e.g., PUSCH) and downlink reception (e.g., downlink data), e.g., panel #1 may receive downlink data and panel #2 may transmit PUSCH during the period of time 630. The period of time 640 includes half duplex resources for uplink data, e.g., panel #1 and panel #2 may both transmit PUSCH during the period of time 640. FIG. 6 also includes a graph 610 showing a signal power over frequency that shows that uplink and downlink signals leak outside of the frequency range provided in the sub-band full-duplex resources of period of time 630.

A slot format may be referred to as a "D+U" slot when the slot has a frequency band that is used for both uplink and downlink transmissions. The downlink and uplink transmissions may occur in overlapping frequency resources (e.g., in-band full duplex resources) or may occur in adjacent or slightly separated frequency resources (e.g., sub-band full duplex resources), as shown in FIG. 5. In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period of time 620 may extend for one or more symbols (e.g., downlink only symbols), the period of time 640 may extend for one or more symbols (e.g., uplink only symbols), and the period of time 630 may extend for one or more symbols (e.g., full-duplex symbols or D+U symbols).

Figure 7:
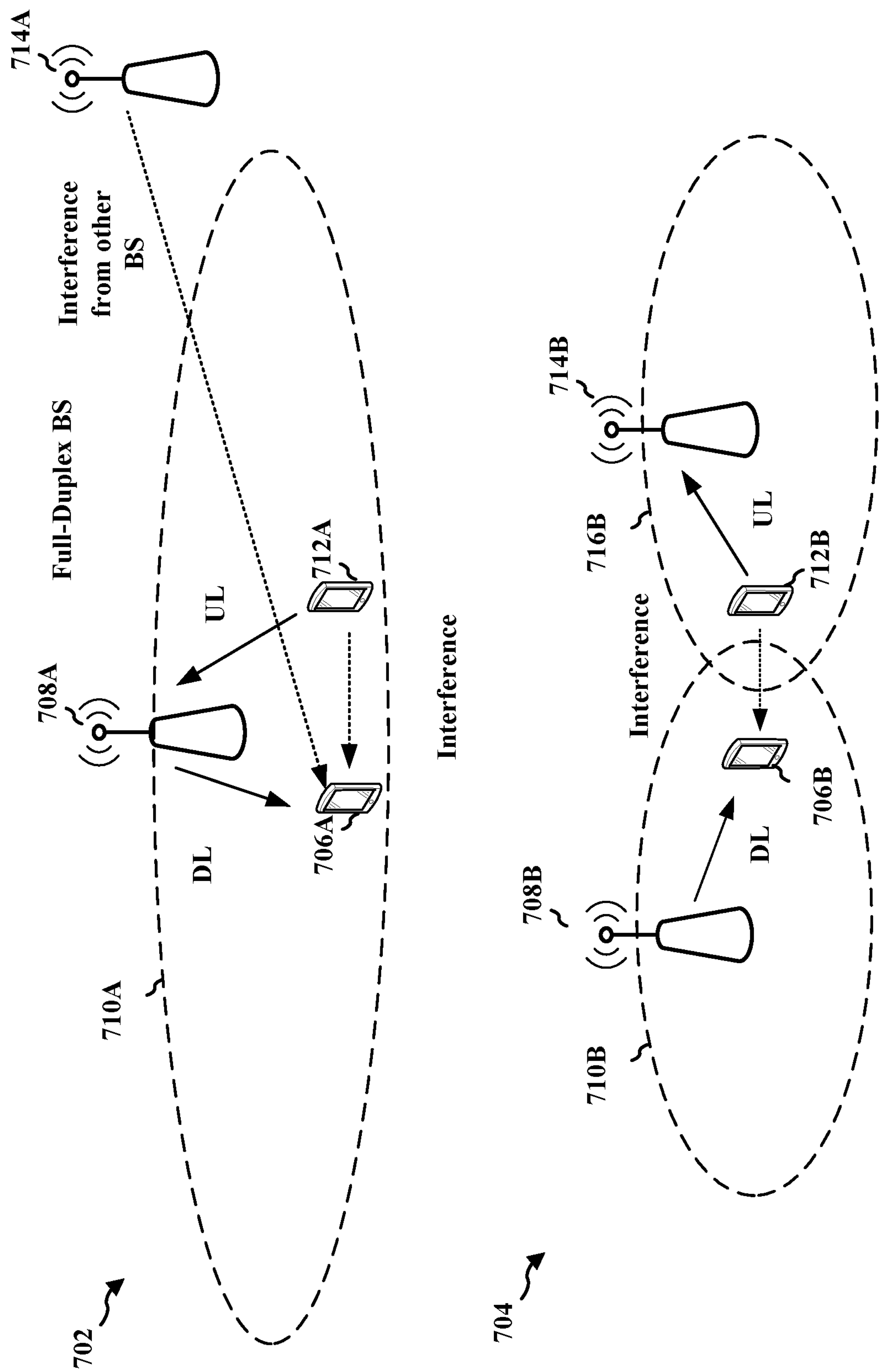
FIG. 7 illustrates diagrams that depict examples of different types of interference.

FIG. 7 includes a first diagram 702 and a second diagram 704 that illustrate examples of different sources of interference for UEs. In the first diagram 702, a first UE 706A may be receiving DL transmissions from a first base station 708A associated with a first cell 710A. The first UE 706A may be operating in a half-duplex mode. The first base station 708A may be operating in a full-duplex mode (e.g., SBFD/IBFD). As such, the first base station 708A may be receiving UL transmissions from a second UE 712A and transmitting DL transmissions to the first UE 706A on overlapping time resources (or on the same frequency resources). For example, the first base station 708A may transmit DL communication and receive UL communication simultaneously. The first UE 706A may experience inter-cell interference from a second base station 714A associated with another cell. The first UE 706A may also experience intra-cell CLI from the second UE 712A. The first UE 706A may be referred to as an "interfered UE" and the second UE 712A may be referred to as an "interfering UE." If the first UE 706A is operating in full-duplex mode, the first UE 706A may experience self-interference (SI).

In the second diagram 704, communications may be based upon dynamic TDD. A first UE 706B may be receiving DL transmissions from a first base station 708B associated with a first cell 710B. The first UE 706B may be operating in half-duplex mode. The first base station 708B may be operating in full-duplex mode (e.g., SBFD/IBFD). A second UE 712B may be transmitting UL transmissions to a second base station 714B associated with a second cell 716B that may be adjacent to the first cell 710B. The first UE 706B may experience inter-cell CLI from the second UE 712B. The first UE 706B may be referred to as an "interfered UE" and the second UE 712B may be referred to as an "interfering UE." If the first UE 706A is operating in full-duplex mode, the first UE 706B may experience SI.

Some UL traffic models may have a periodic pattern. As such, an interfered UE may experience CLI or SI with a periodic pattern. A base station may configure the interfered UE to report CLI via an UL MAC-CE (also referred to as layer 2 (L2) reporting) in order to reduce reporting overhead and obtain accurate semi-static interference measurements. L2 reporting may be faster and more dynamic compared to layer 3 (L3) reporting. The base station may configure a semi-persistent measurement resource for CLI/SI measurement. For instance, the base station may configure an interfering UE with a semi-persistent (e.g., periodic) SRS resource set. The base station may activate/deactivate the semi-persistent SRS via MAC-CE and may indicate a predefined Tx power (e.g., max power P_cmax). The base station may configure the interfered UE with semi-persistent channel state information interference measurement (CSI-IM) resources. The base station may activate/deactivate the semi-persistent CSI-IM resources via a MAC-CE.

The base station may also configure L2 event-based CLI/SI reporting in which the interfered UE reports one or more CLI values via a MAC-CE based on a triggering event. The base station may define CLI triggering events and CLI report MAC-CE contents for the interfered UE. The base station may jointly utilize a MAC-CE for triggering CSI-IM and CLI reporting. The interfered UE may measure CLI as a function of Tx power and coupling loss (CL). If the coupling loss is known, the UE may estimate CLI for different Tx powers.

A base station may trigger CSI reporting by a UE in different manners. In one example, the base station may transmit a DCI to a UE on a PUSCH that triggers AP CSI reporting by the UE. In another example, the base station may transmit a DCI to a UE on a PUSCH that triggers semi-persistent CSI reporting by the UE. In yet another example, the base station may transmit a MAC-CE to a UE on a PUCCH that triggers the semi-persistent CSI reporting by the UE.

Figure 8:
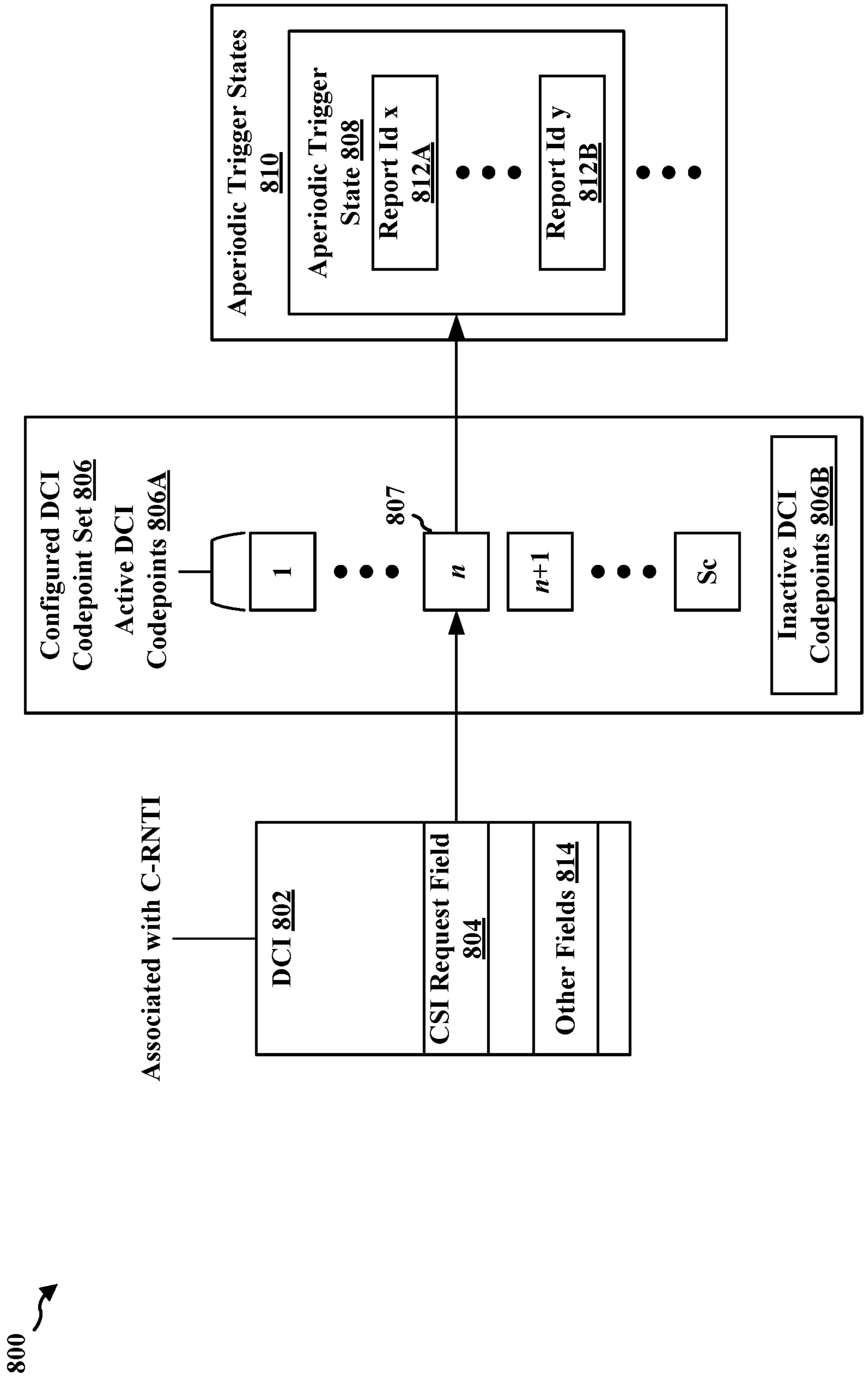
FIG. 8 is a diagram that illustrates an example of downlink control information (DCI) associated with aperiodic (AP) channel-state information (CSI) reporting.

FIG. 8 is a diagram 800 that illustrates an example of DCI-based aperiodic CSI report triggering. A base station may transmit a DCI 802 (e.g., such as a "DCI format 0_1") to a UE on a PUSCH that triggers the UE to transmit an aperiodic CSI report to the base station. The DCI 802 may include a CSI request field 804 that indicates whether the DCI includes a request for a CSI report. The CSI request field 804 may be configured with a set of bits that are used to provide the indication. As an example, the CSI request field may be between zero and six bits wide. If the CSI request field 804 includes all zero bits (e.g., the CSI request field 804 includes "000000"), the DCI 802 may not request a CSI report and the DCI 802 may schedule a PUSCH transmission containing UL data.

If the CSI request field 804 includes a non-zero bit, the CSI request field 804 may point to a code point from a set of active DCI codepoints 806A. In an example, the CSI request field 804 may point to DCI codepoint n 807. As an example, the active DCI codepoints 806A may include 64 codepoints (e.g., $Sc=2^6=64$) when the CSI request field 804 is six bits wide. The active DCI codepoints 806A belong to a configured DCI codepoint set 806 along with the inactive DCI codepoints 806B. The configured DCI codepoint set 806 may include up to one hundred twenty eight DCI codepoints. The configured DCI codepoint set 806 may be configured for the UE in an RRC configuration. A UE may receive a MAC-CE message that provides a sub-selection to indicate the active DCI codepoints 806A and/or the inactive DCI codepoints 806B from the set of RRC configured DCI codepoints. As an example, from the larger RRC configured set of 128 codepoints, a subset of up to 64 codepoints may be activated. The DCI 802 may be associated with a cell radio-network temporary identifier (C-RNTI). For instance, a base station may scramble a cyclic redundancy check (CRC) of the DCI 802 with the C-RNTI. A UE may interpret a DCI (e.g., the DCI 802) differently depending upon a type of radio-network temporary identifier (RNTI) used for scrambling the DCI.

The DCI codepoint n 807 (or another DCI codepoint in the active DCI codepoints 806A) may point to an aperiodic trigger state 808 in aperiodic trigger states 810 configured by RRC communications. The aperiodic trigger state 808 may be defined as a list of aperiodic CSI report settings identified by one or more CSI report setting identifiers (IDs) 812A-812B. The aperiodic trigger state 808 may include up to sixteen aperiodic CSI report settings, and hence the aperiodic trigger state 808 may trigger up to sixteen CSI reports. For each of the CSI report setting IDs 812A-812B, a UE may calculate a CSI and include the calculated CSI in a scheduled PUSCH transmission to a base station.

The DCI 802 may also include other fields 814. The other fields 814 may include an identifier for DCI formats, a carrier indicator, an UL/shared uplink (SUL) indicator, a bandwidth part indicator, a frequency domain resource assignment, a time domain resource assignment, a frequency hopping flag, a modulation and coding scheme, a new data indicator, a redundancy version, a HARQ process number, a first DL assignment index, a second DL assignment index, a transmission power control (TPC) command for a scheduled PUSCH, a SRS resource indicator, precoding information and number of layers, antenna ports, an SRS request, code block group (CBG) transmission information, a phase tracking reference signal (PTRS) DM-RS association, a beta offset indicator, a DM-RS sequence initialization, and/or a UL shared channel (UL-SCH) indicator.

Figure 9:
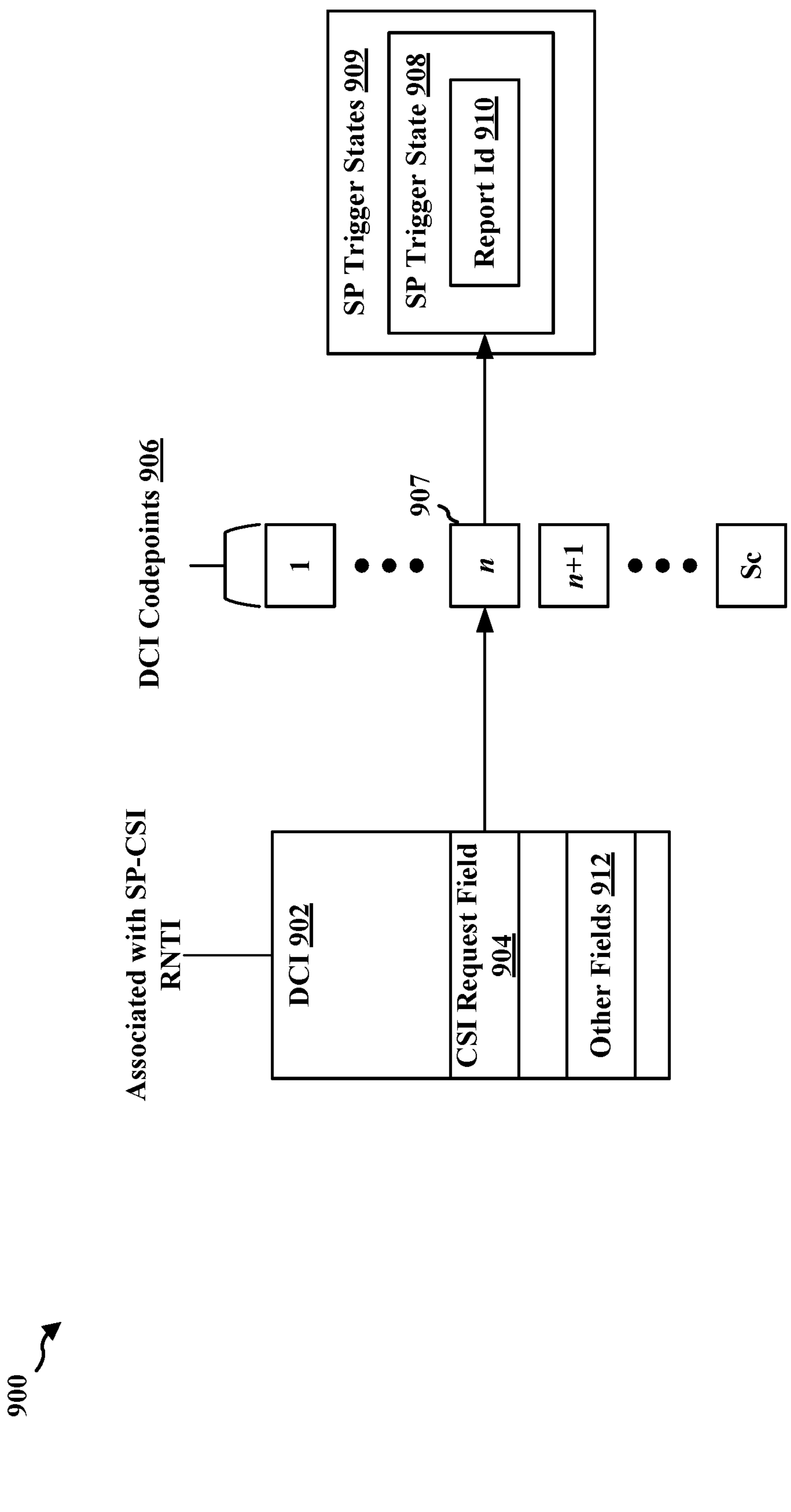
FIG. 9 is a diagram that illustrates an example of DCI associated with semi-persistent (SP) CSI reporting.

FIG. 9 is a diagram 900 that illustrates an example of DCI-based SP CSI report triggering. A base station may transmit a DCI 902 (e.g., a "DCI format 0_1") to a UE on a PUSCH that triggers the UE to transmit a semi-persistent CSI report to the base station. The DCI 902 may include a CSI request field 904. The CSI request field 904 may be configured to be between zero and six bits wide.

If the CSI request field 904 includes a non-zero bit, the CSI request field 904 may point to a code point in DCI codepoints 906. In an example, the CSI request field 904 may point to DCI codepoint n 907. The DCI codepoints 906 may include 64 codepoints (e.g., $Sc=2^6=64$) when the CSI request field 904 is six bits wide. Unlike DCI-based aperiodic CSI report triggering, the number of codepoints may be fixed for DCI-based semi-persistent CSI report triggering, that is, no MAC-CE sub-selection may occur to select active DCI codepoints from a set of DCI codepoints. The DCI 902 may be associated with a semi-persistent CSI RNTI. For instance, a base station may scramble CRC of the DCI 902 with the semi-persistent CSI RNTI. A UE may interpret a DCI (e.g., a DCI 0_1) differently depending upon a type of RNTI used for scrambling the DCI. A DCI that is CRC scrambled with a semi-persistent CSI RNTI may be used for semi-persistent CSI activation/deactivation and UL data may not be multiplexed on the semi-persistent PUSCH.

The DCI codepoint n 907 (or another DCI codepoint in the DCI codepoints 906) may point to a semi-persistent trigger state 908 in semi-persistent trigger states 909 defined by RRC communications. The semi-persistent trigger state 908 may be defined as a semi-persistent CSI report setting identified by a CSI report setting ID 910. Unlike DCI-based aperiodic CSI report triggering, the semi-persistent trigger state 908 may trigger a single CSI report. The semi-persistent trigger state 908 may contain mapping to a single semi-persistent CSI report setting. A codepoint of the CSI request field 904 may map to a semi-persistent CSI report setting configured in RRC communications (without a MAC-CE sub-selection). For the CSI report setting ID 910, a UE may calculate a CSI and include the calculated CSI in a scheduled PUSCH transmission to a base station.

The DCI 902 may also include other fields 912 that may include some or all of the other fields 814 described above in the description of FIG. 8. Activation and deactivation of CSI reporting may be based upon data within the other fields 912. For example, a HARQ process number (i.e., a HARQ process ID) and a redundancy version in the other fields 912 may be used for both activation and deactivation of CSI reporting and a modulation and coding scheme and a resource block indication in the other fields 912 may be used for activation of CSI reporting.

Figure 10:
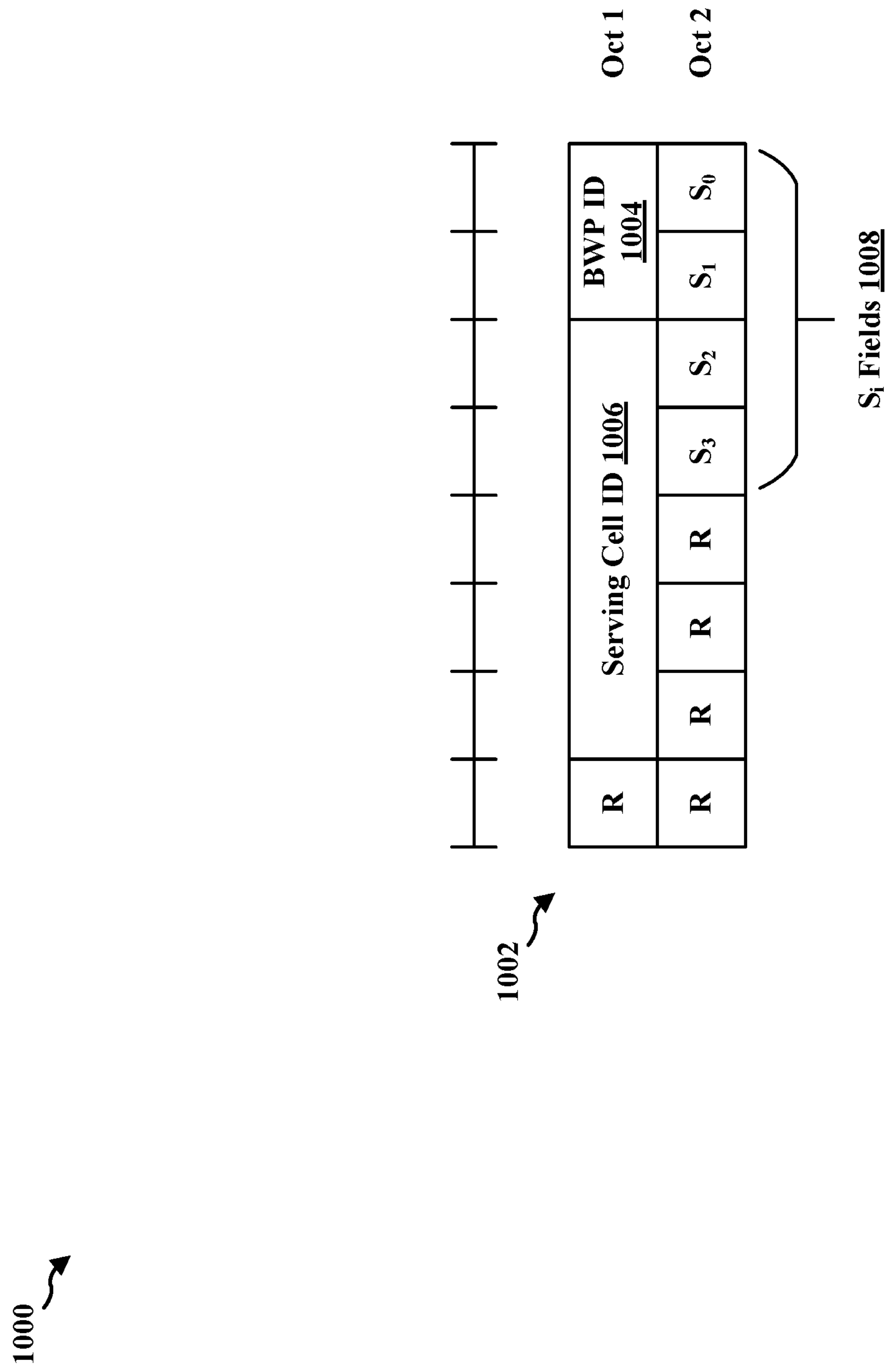
FIG. 10 is a diagram that illustrates an example of a medium access control element (MAC-CE) associated with SP CSI reporting.

FIG. 10 is a diagram 1000 that illustrates an example of MAC-CE based semi-persistent CSI report triggering. A base station may transmit a MAC-CE 1002 to a UE on a PUCCH that triggers the UE to transmit a semi-persistent CSI report to the base station. The MAC-CE 1002 may include a BWP ID 1004. The MAC-CE 1002 may include a serving cell ID 1006, that is, an ID of a component carrier (CC) on which the UE is to transmit a CSI report. The BWP ID 1004, the serving cell ID 1006, and a reserved bit "R" may form a first octet within the MAC-CE 1002. The MAC-CE 1002 may include $S_i$ fields 1008 (e.g., $S_0$, $S_1$, $S_2$, and $S_3$. The $S_i$ fields 1008 may indicate an activation/deactivation status of semi-persistent CSI report configurations within csi-ReportConfigToAddModList. So may refer to a report configuration which includes PUCCH resources for semi-persistent CSI reporting in the BWP corresponding to the BWP ID 1004 and that has a lowest CSI-ReportConfigId within a list of a type set to semiPersistentOnPUCCH, $S_1$ may refer to a report configuration that has a second lowest CSI-ReportConfigId, $S_2$ may refer to a report configuration that has a third lowest CSI-ReportConfigId, and $S_3$ may refer to a report configuration that has a fourth lowest CSI-ReportConfigId. If a number of report configurations is less than i+1, a MAC entity may ignore the $S_i$ fields. A field within the $S_i$ fields 1008 may be set to "1" to indicate that a corresponding semi-persistent CSI report configuration is to be activated. A field within the $S_i$ fields 1008 may be set to 0 to indicate that the corresponding semi-persistent CSI report configuration is to be deactivated. The $S_i$ fields 1008 and four reserved bits R may form a second octet within the MAC-CE 1002.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

A first UE (e.g., an interfered UE) may experience CLI from a second UE (e.g., an interfering UE) when the first UE transmits and receives data on the same frequency band. CLI may impact communications reliability at the first UE. A need exists for efficient triggering of CLI reporting by a UE such that a base station and/or the UE can adjust transmission/reception parameters to mitigate the effect of CLI.

To improve the exchange of information about CLI and the efficiency of addressing CLI, L1 (DCI-based) activation and deactivation of L2 (MAC-CE) based CLI reporting is disclosed herein. The L1 activation/deactivation may be based upon DCI associated with RNTIs used for AP or SP CSI reporting. L1 activation/deactivation of L2 CLI reporting may be faster in comparison to L2 activation of L2 CLI reporting. Also disclosed herein are techniques for parameter adaptation (e.g., adaptation of wideband vs. sub-band, adaptation of sub-bands to be reported, other CLI reporting parameters such as periodicity, etc.) of L2 CLI reporting.

In an example, a UE receives an L1 signaling, such as DCI, for activating MAC-CE CLI reporting. The UE transmits one or more MAC-CE CLI reports based upon the DCI. As the MAC-CE CLI reporting is triggered by DCI, activation of the MAC-CE CLI reporting may be faster in comparison to activation of MAC-CE CLI reporting by L2 signaling. As the UE may be able to more rapidly transmit MAC-CE CLI reports to a base station via activation of the MAC-CE CLI reporting by the DCI, the base station and/or the UE may be able to more rapidly adjust transmission/reception parameters to mitigate the effect of CLI.

Figure 14:
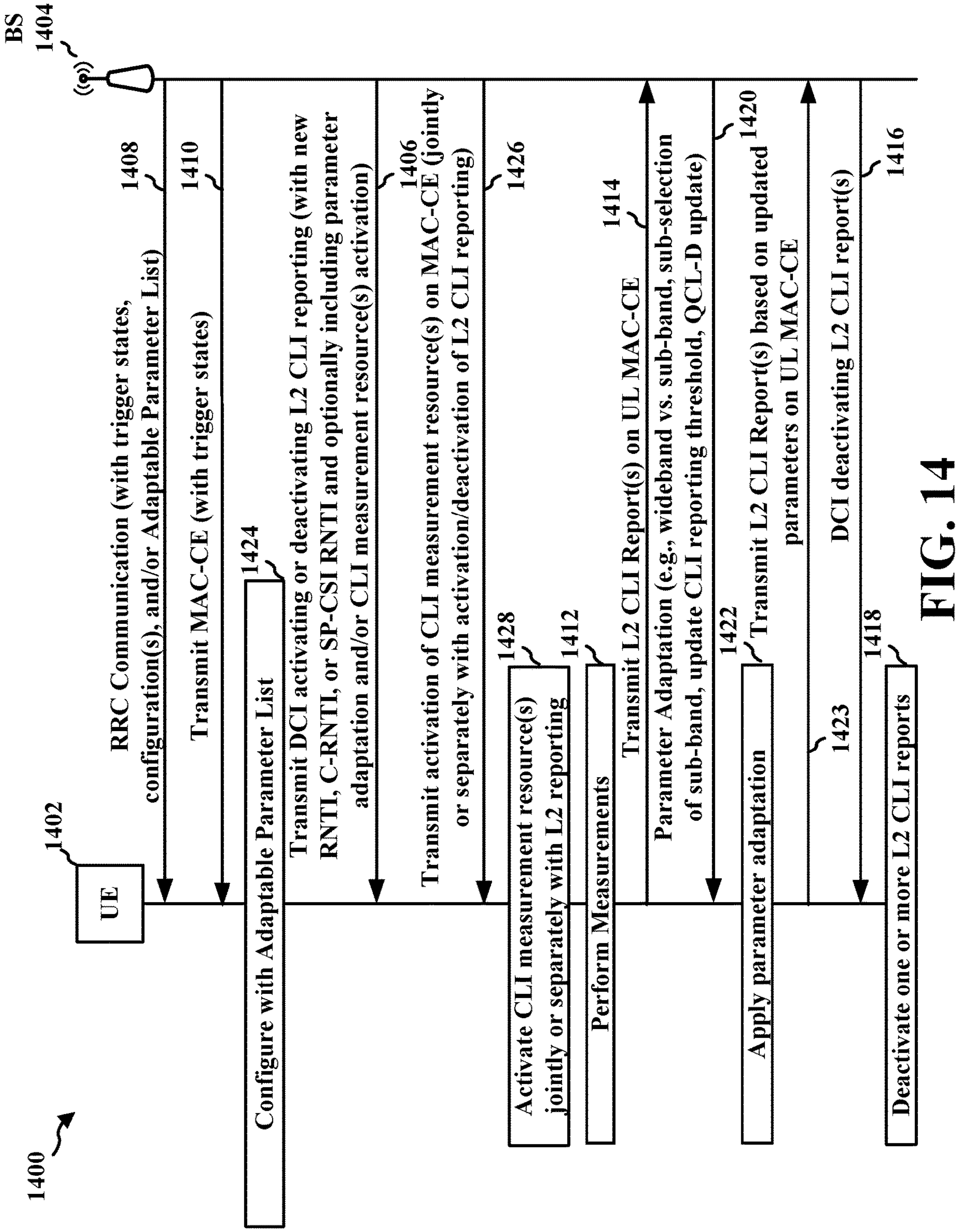
FIG. 14 is a communications flow diagram between a UE and a base station.

FIG. 14 is a communications flow diagram 1400 illustrating example communications between a UE 1402 and a base station 1404. The UE 1402 may be an interfered UE that is experiencing CLI from one or more UEs in proximity to the UE 1402. In an example, the UE 1402 may be operating in a full duplex mode, such as SBFD or IBFD. At 1406, the base station 1404 transmits DCI (alternatively referred to as UE-dedicated DCI or L1 signaling) to the UE 1402 for activating (or deactivating) L2 CLI reporting on an UL MAC-CE. In an example, the DCI may be DCI format 0_1, such as the DCI 802 or the DCI 902.

In one aspect, the DCI transmitted at 1406 may be associated with an RNTI that is configured to, or dedicated for, triggering L2 CLI reporting. For instance, the base station 1404 may scramble the CRC of the DCI with the new RNTI. The new RNTI may be different than a C-RNTI or a semi-persistent CSI RNTI (SP-CSI RNTI). A CSI request field in the DCI (e.g., a CSI request field similar to the CSI request field 804 or the CSI request field 904) may include one or more bits that indicate that L2 CLI reporting (also referred to as MAC-CE CLI reporting) is to be activated or deactivated. In such an aspect, at 1408, the base station 1404 may configure a list of L2 trigger states via an RRC communication. An L2 trigger state may include (i.e., contain a mapping to) a single L2 CLI report setting.

In one aspect, the DCI transmitted at 1406 may be associated with a SP-CSI RNTI. The SP-CSI RNTI may trigger L2 CLI reporting. Additionally, the SP-CSI RNTI may also trigger SP CSI reporting due to the DCI not being utilized for scheduling UL-SCH transmissions. In an example, a subset of trigger states (i.e., a subset of the semi-persistent trigger states 909) may be reserved for L2 CLI reporting. For instance, at 1408, the base station 1404 may reserve the subset of the trigger states via the RRC communication. In an example, trigger states one through forty-eight may be reserved for semi-persistent CSI reporting and trigger states forty-nine through sixty-four may be reserved for L2 CLI reporting. This is merely one example to illustrate the concept, and the subset of trigger states for semi-persistent CSI reporting and for L2 CLI reporting may be different. In the example, if the DCI includes an indication of trigger state fifty-five, the UE 1402 is informed that L2 CLI reporting is to be utilized instead of SP CSI reporting.

In another example, at 1410, the base station 1404 may transmit a MAC-CE to the UE 1402. The MAC-CE may select the subset of trigger states (e.g., a subset of the semi-persistent trigger states 909) that are reserved for L2 CLI reporting. The DCI transmitted at 1406 may include one or more bits that select a trigger state in the subset of trigger states. In an example, bits in the CSI request field 904 may select the trigger state.

In another example, fields in the DCI transmitted at 1406 may be used to differentiate between semi-persistent CSI reporting and L2 CLI reporting. The DCI may not be used for scheduling UL-SCH. For instance, one of more of the other fields 912 may be used to trigger L2 CLI reporting. Activation and deactivation of SP CSI reporting may be determined based upon a combination of fields of the DCI.

In one aspect, the DCI transmitted at 1406 may be associated with a C-RNTI. The C-RNTI may trigger L2 CLI reporting. In an example, a subset of trigger states (i.e., a subset of the aperiodic trigger states 810) may be reserved for L2 CLI reporting. For instance, at 1408, the base station 1404 may reserve the subset of the trigger states via the RRC communication. In an example, trigger states one through forty-eight may be reserved for aperiodic CSI reporting and trigger states forty-nine through sixty-four may be reserved for L2 CLI reporting. This is merely one example to illustrate the concept, and the subset of trigger states for aperiodic CSI reporting and for L2 CLI reporting may be different.

Figure 11:
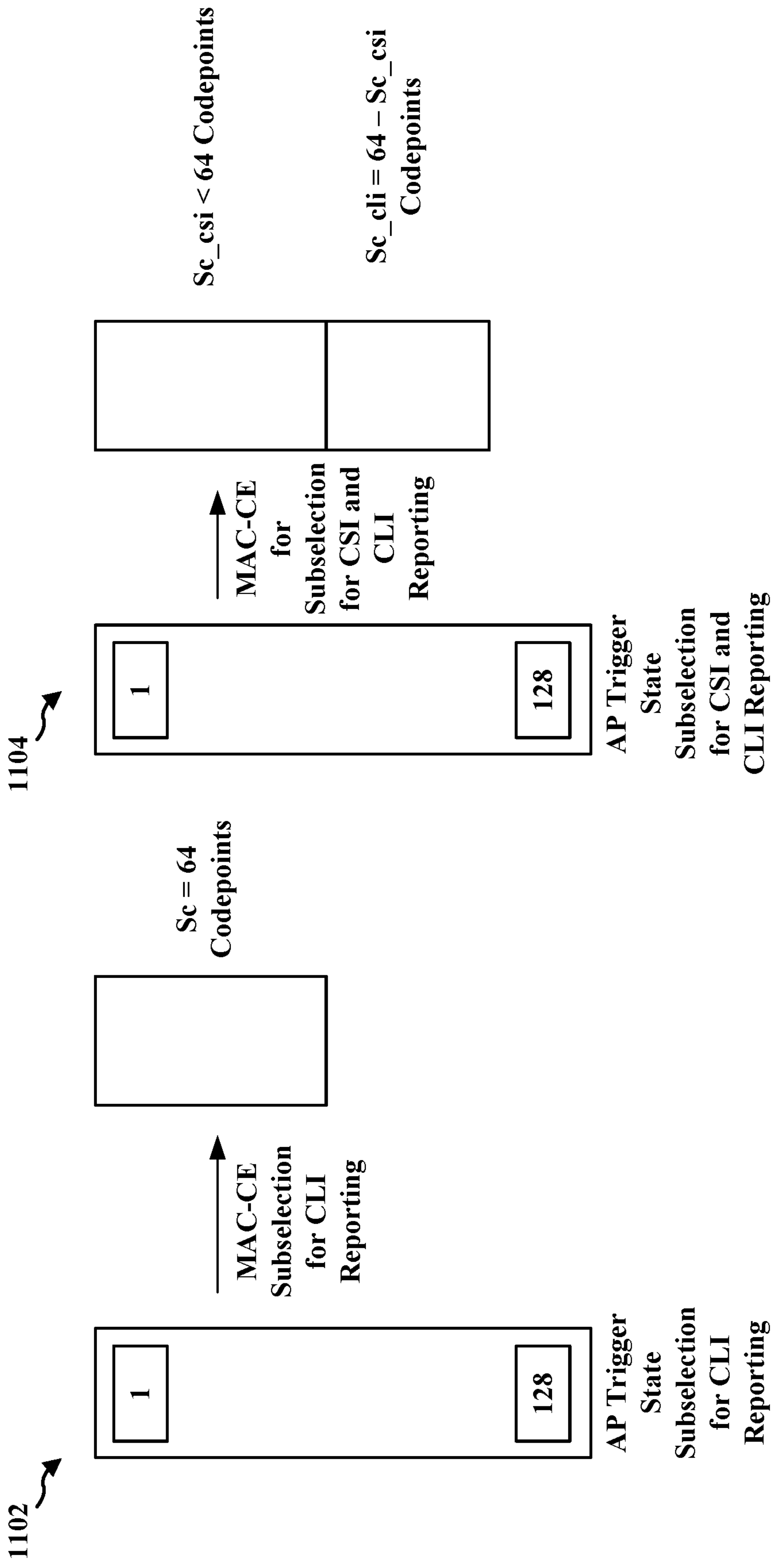
FIG. 11 is a diagram that illustrates examples of selections of AP trigger states for AP crosslink interference (CLI) reporting.

In another example, at 1410, the base station 1404 may transmit a MAC-CE configured for, or dedicated for, the sub-selection of codepoints for L2 CLI reporting to the UE 1402. The MAC-CE may indicate a subset of codepoints (e.g., a subset of the configured DCI codepoint set 806) reserved for L2 CLI reporting. Referring to FIG. 11, a first diagram 1102 is illustrated which depicts MAC-CE subselection for CLI reporting. A second diagram 1104 is also illustrated which depicts a MAC-CE sub-selection for CSI and CLI reporting. A MAC-CE (e.g., the MAC-CE transmitted at 1410) may indicate a number of codepoints (Sc_csi) that are active for CSI reporting. Remaining codepoints (Sc_cli) are active for L2 CLI reporting.

At 1412, the UE 1402 may perform measurements on (activated) CLI measurement resources based upon the DCI received from the base station 1404 at 1406. For instance, the measurements may include received signal strength indicator (RSSI) measurements on the (activated) CLI measurement resources. At 1414, the UE 1402 may transmit one or more L2 CLI reports on an UL MAC-CE to the base station 1404. The one or more L2 CLI reports may include the measurements.

In one aspect, at 1408, the base station 1404 may configure the UE 1402 with multiple CLI report configurations. At 1406, the DCI received by the UE 1402 may trigger the UE 1402 to transmit more than one L2 CLI report. At 1416, the base station 1404 may transmit DCI (e.g., a DCI associated with a new RNTI, a SP-CSI RNTI, or a C-RNTI as described above) deactivating one or more L2 CLI reports based upon the L2 CLI report(s) received by the base station 1404 at 1414. At 1418, the UE 1402 may deactivate one or more of the L2 CLI reports based upon the DCI received at 1416.

CLI experienced by a UE may be dynamic due to changing locations of other UEs around the UE. As such, in one aspect, at 1420, the base station 1404 may transmit a parameter adaptation via DCI (e.g., a DCI associated with a new RNTI, a SP-CSI RNTI, or a C-RNTI as described above) to the UE 1402 based upon the L2 CLI report(s) received by the base station 1404 at 1414. The parameter adaptation may include one or more of a wideband vs. a sub-band reporting indication (i.e., reporting granularity), a sub-selection of sub-bands that are to be reported, an update of a CLI reporting threshold (e.g., an update of a threshold that is to be met for L2 CLI reporting to occur), and/or a type D quasi-co-location (QCL-D) update of a measurement resource. At 1422, the UE 1402 may apply the parameter adaptation to the L2 CLI reporting such that subsequent L2 reports are reported by the UE 1402 based upon the parameter adaptation. In an example, the parameter adaptation may cause the UE 1402 to change from wideband CLI reporting to sub-band CLI reporting. The UE 1402 may apply the parameter adaptation in a more rapid manner in comparison to deactivating one or more L2 CLI reports.

In one aspect, the base station 1404 may signal the parameter adaptation via fields in a DCI (e.g., the other fields 814 and 912 in the DCI 802 and the DCI 902, respectively) that activates L2 CLI reporting. In an example, if at 1420 the UE 1402 receives an activation DCI for an already activated L2 CLI report, the UE 1402 may interpret the activation DCI as signaling parameter adaptation for the already activated L2 CLI report. As such, at 1422, the UE 1402 may apply the parameter adaptation. As such, subsequent L2 CLI reports are based upon parameters in the parameter adaptation.

In one aspect, at 1408, the UE 1402 may receive an adaptable parameter list (e.g., a list of the parameter adaptation described above) via RRC communications from the base station 1404. In such an aspect, at 1424, the UE 1402 is configured with the adaptable parameter list.

In an example, the adaptable parameter list may include a list of sub-bands or a combination of sub-bands that are to be reported in an L2 CLI report. For instance, the list may indicate that (1) sub-band 1 and sub-band 2 are to be reported, (2) sub-band 1 is to be reported, or (3) sub-band 2 is to be reported. In one aspect, upon a first activation of an L2 CLI report, the adaptable parameter list has an entry that is activated by default (e.g., a first entry—sub-band 1 and sub-band 2). As such, when the UE 1402 receives the DCI at 1406, the DCI triggers the UE 1402 to transmit a L2 CLI report based upon sub-band 1 and sub-band 2. In another aspect, upon the first activation of the L2 CLI report, the DCI received by the UE 1402 at 1406 specifies an entry in the adaptable parameter list (e.g., sub-band 1).

Figure 12:
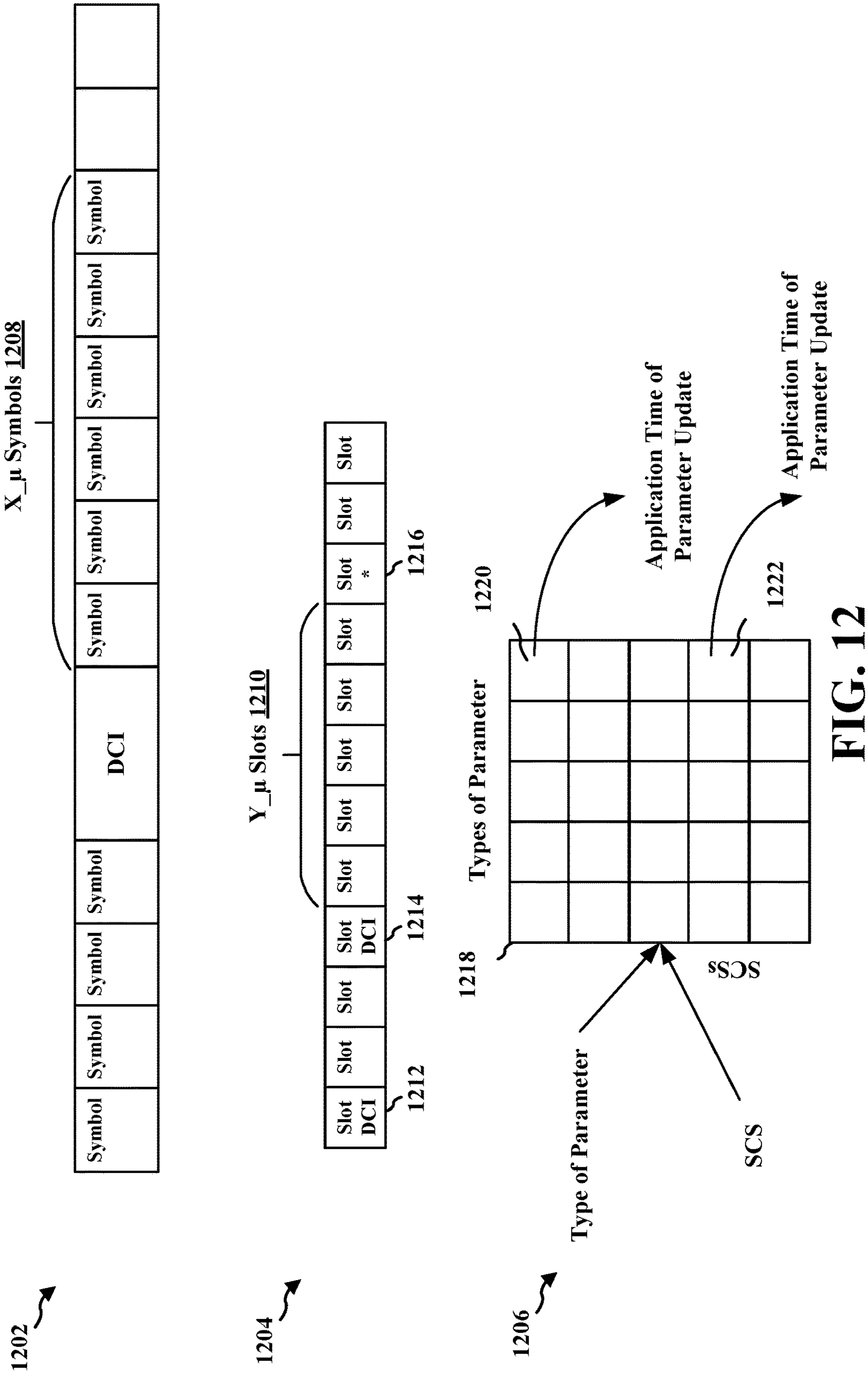
FIG. 12 includes diagrams of examples of timings of applying parameter updates for CLI reporting.

As indicated above, the UE 1402 may receive a parameter adaptation transmitted by the UE 1402 at 1420. The UE 1402 may apply the parameter adaptation at a time that is determined based upon various factors. At 1423, the UE 1402 may transmit a L2 CLI report (or reports) based on the parameter adaptation. FIG. 12 illustrates a first diagram 1202, a second diagram 1204, and a third diagram 1206 that illustrate different manners of determining when the UE 1402 is to apply the parameter adaptation (also referred to as a parameter update).

In one aspect illustrated in the first diagram 1202, the UE 1402 may apply a parameter update after a minimum of $X\_\mu$ number of symbols 1208 occurring after the DCI carrying the parameter update (e.g., the DCI received by the UE 1402 at 1420) is received by the UE 1402, e.g., where $X\_\mu$ is an integer number. The minimum of $X\_\mu$ number of symbols 1208 may vary depending on a SCS of the BWP.

In one aspect illustrated in the second diagram 1204, the UE 1402 may apply a parameter update after a minimum of $Y\_\mu$ number of slots 1210 from a slot carrying the DCI with the parameter update, where $Y\_\mu$ is an integer number. In an example, a DCI may be received by the UE 1402 at slot 1212 and a DCI that includes a parameter update is received at slot 1214. The UE 1402 may apply the parameter update indicated by the DCI received in slot 1214 at slot 1216. However, for slots occurring within the minimum of $Y\_\mu$ number of slots 1210, the UE 1402 applies parameters specified by the DCI received at slot 1212.

In one aspect illustrated in the third diagram 1206, the UE 1402 may access a table 1218 based upon a type of parameter indicated in a parameter update and a SCS. The table 1218 may have a first dimension corresponding to different types of parameters (e.g., wideband vs. a sub-band reporting indication, a sub-selection of sub-bands that are to be reported, etc.) and a second dimension corresponding to different SCSs. Each entry in the table may include an application time of a parameter update. For example, entry 1220 of the table 1218 may include an application time of a QCL-D update and entry 1222 of the table 1218 may include a wideband vs. sub-band reporting update application time.

Figure 13:
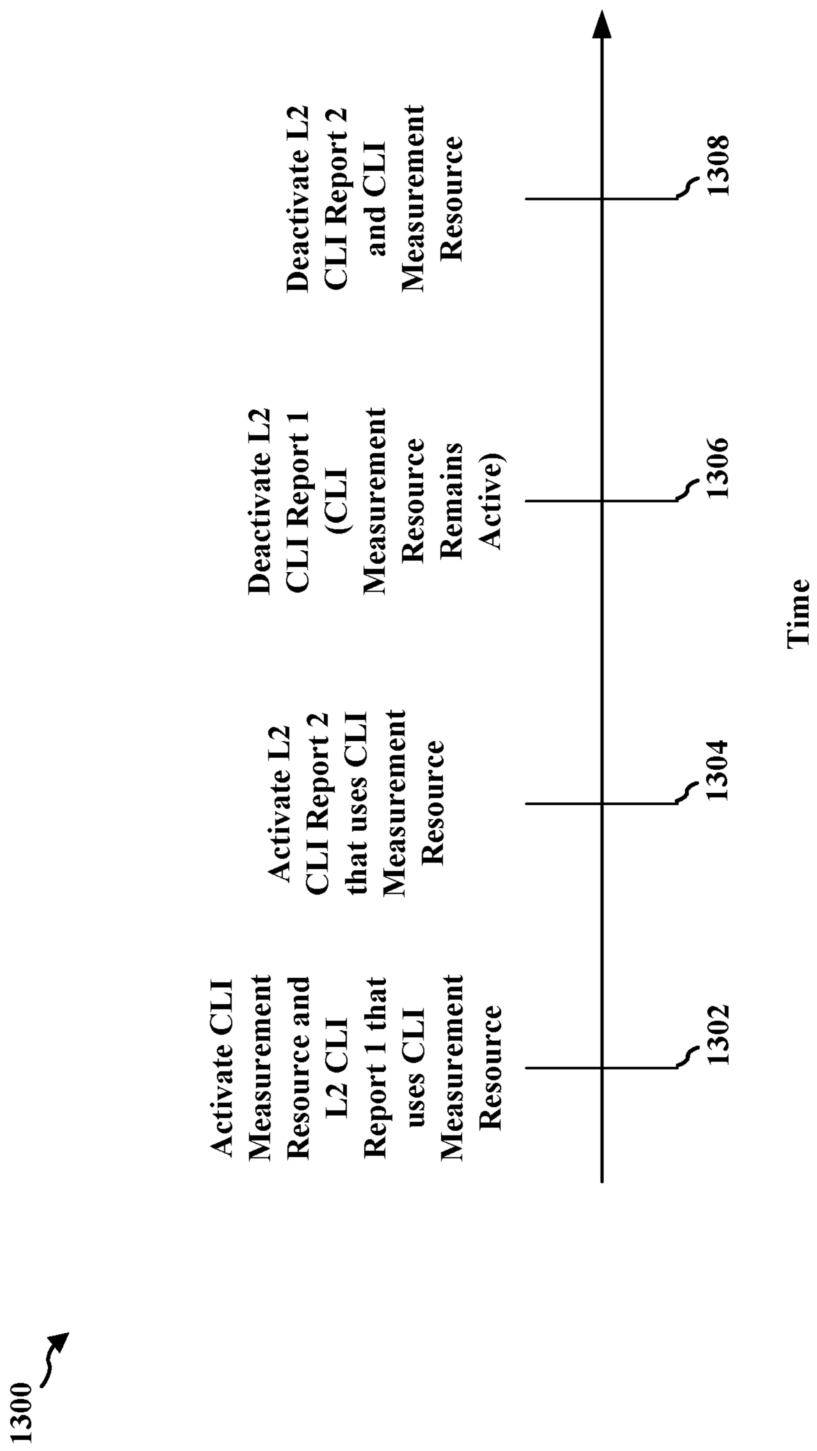
FIG. 13 is a diagram that depicts a timeline of joint activation of CLI measurement resources and L2 CLI reporting.

In one aspect, the base station 1404 may separately activate/deactivate a CLI measurement resource and L2 CLI reporting. This may be useful if the same CLI measurement resource can be used for L1 CLI reporting. Referring to FIG. 13, at 1426, the base station 1404 may transmit an activation of one or more CLI measurement resources separately from transmitting the DCI at 1406 which activates the L2 CLI reporting. The activation may be transmitted via a MAC-CE. At 1428, the UE 1402 activates the one or more CLI measurement resources.

In one aspect, the base station 1404 may jointly activate CLI measurement resources and L2 CLI reporting via the DCI transmitted at 1406. In such an aspect, the UE 1402 may activate the CLI measurement resources at 1428 and may begin L2 CLI reporting jointly. In one example, there may be a one to one correspondence between a L2 CLI report and an associated CLI measurement resource(s), that is, CLI measurement resources are not shared between L2 CLI reports.

In another example, CLI measurement resource(s) may be shared between one or more L2 CLI reports. For instance, a first L2 CLI report and a second L2 CLI report may share the same CLI measurement resource(s). Referring to FIG. 13, a diagram 1300 illustrating sharing of a CLI measurement resource is depicted. At 1302, the base station 1404 may transmit L1 signaling that activates a CLI measurement resource and a first L2 CLI report that uses the CLI measurement resource. At 1304, the base station 1404 may transmit L1 signaling that activates a second CLI report that uses the CLI measurement resource. At 1306, the base station 1404 may transmit L1 signaling that deactivates the first CLI report. The CLI measurement resource may remain active. At 1308, the base station 1404 may transmit L1 signaling that deactivates the second CLI report. The CLI measurement resource may be deactivated as the CLI measurement resource is no longer utilized for CLI reports.

Figure 15:
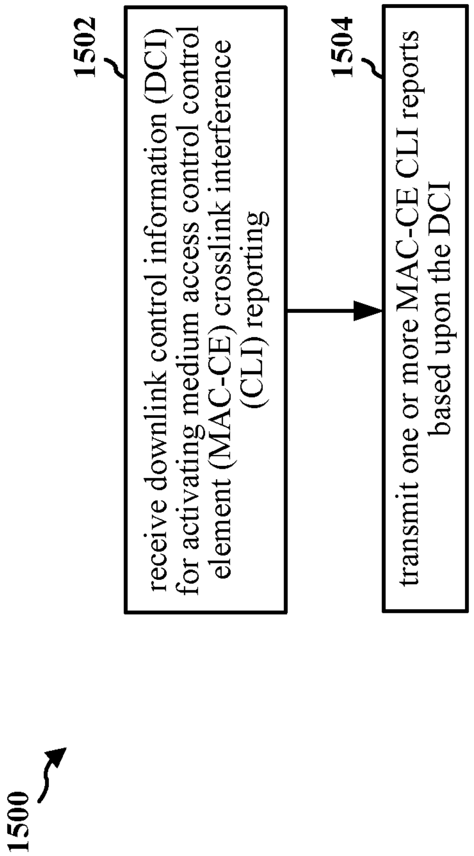
FIG. 15 is a flowchart of a method of wireless communication.

FIG. 15 is a flowchart 1500 of a method of wireless communication. The method may be performed by a UE (e.g., the UE 104, the UE 350, the UE 1402, the apparatus 1904). In an example, the method may be performed by the L2 CLI report component 198 described above. The method may be associated with various advantages for the UE, such as faster triggering of MAC-CE CLI reporting.

At 1502, the UE receives DCI for activating MAC-CE CLI reporting. For example, referring to FIG. 14, the UE 1402 may receive DCI for activating L2 CLI reporting transmitted by the base station 1404 at 1406. In another example, the DCI may be the DCI 802 or the DCI 902 in FIGS. 8 and 9, respectively.

At 1504, the UE transmits one or more MAC-CE CLI reports based upon the DCI. For example, referring to FIG. 14, at 1414 the UE 1402 may transmit one or more L2 CLI reports on an UL MAC-CE.

Figure 16:
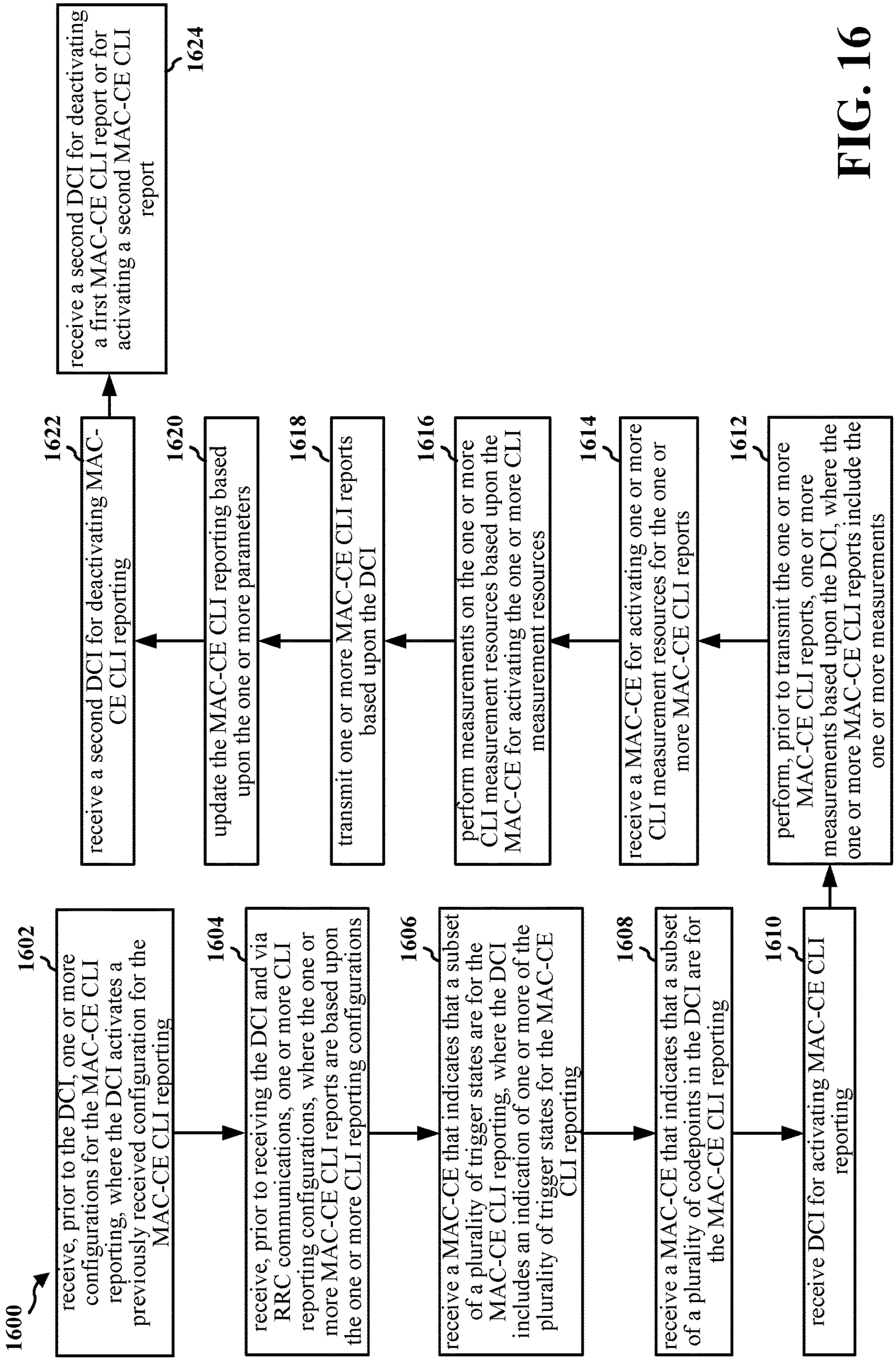
FIG. 16 is a flowchart of a method of wireless communication.

FIG. 16 is a flowchart 1600 of a method of wireless communication. The method may be performed by a UE (e.g., the UE 104, the UE 350, the UE 1402, the apparatus 1904). In an example, the method (including the various configurations described below) may be performed by the L2 CLI report component 198 described above. The method may be associated with various advantages for the UE, such as faster triggering of MAC-CE CLI reporting.

At 1610, the UE receives DCI for activating MAC-CE CLI reporting. For example, referring to FIG. 14, the UE 1402 may receive DCI for activating L2 CLI reporting transmitted by the base station 1404 at 1406. In another example, the DCI may be the DCI 802 or the DCI 902 in FIGS. 8 and 9, respectively.

At 1618, the UE transmits one or more MAC-CE CLI reports based upon the DCI. For example, referring to FIG. 14, at 1414 the UE 1402 may transmit one or more L2 CLI reports on an UL MAC-CE.

In some aspects, at 1602, the UE may receive, prior to the DCI, one or more configurations for the MAC-CE CLI reporting, where the DCI activates a previously received configuration for the MAC-CE CLI reporting. For example, referring to FIG. 14, at 1408, the UE 1402 may receive RRC communication that includes configurations for MAC-CE CLI reporting and at 1406, the DCI may activate the configurations.

In some aspects, at 1612, the UE may perform, prior to transmit the one or more MAC-CE CLI reports, one or more measurements based upon the DCI, where the one or more MAC-CE CLI reports include the one or more measurements. For example, referring to FIG. 14, at 1412, the UE 1402 may perform measurements based upon DCI transmitted by the base station 1404 at 1406. In an example, at 1414, the L2 CLI reports transmitted by the UE 1402 may include the measurements.

In some aspects, at 1622, the UE may receive a second DCI for deactivating the MAC-CE CLI reporting. For example, referring to FIG. 14, at 1416, the UE 1402 may receive DCI for deactivating L2 CLI reports. In an example, the DCI may be the DCI 802 or the DCI 902 in FIGS. 8 and 9, respectively.

In some aspects, the DCI may be based on an RNTI associated with the MAC-CE CLI reporting, where the RNTI may be different than at least one other RNTI used for aperiodic CSI reporting, where a CSI request field in the DCI may indicate that the MAC-CE CLI reporting is to be activated, and where a trigger state configured in RRC may include a mapping to a L2 CLI report setting. For example, referring to FIG. 14, the DCI transmitted at 1406 may be associated with a new RNTI. In another example, referring to FIG. 8, the CSI request field 804 may indicate that MAC-CE CLI reporting is to be activated. In a further example, referring to FIG. 8, the aperiodic trigger state 808 may include a mapping to a CSI report setting ID 812A. In another example, the aperiodic trigger state 808 may include a mapping to a CSI report setting ID 812B.

In some aspects, the DCI may be based on a RNTI that triggers the MAC-CE CLI reporting, where the RNTI may be equivalent to at least one other RNTI used for semi-persistent CSI reporting. For example, referring to FIG. 14, the DCI transmitted at 1406 may be associated with a SP-CSI RNTI. In another example, referring to FIG. 9, the SP-CSI RNTI may be associated with the DCI 902.

In some aspects, the DCI may be associated with a plurality of trigger states, where a subset of the plurality of trigger states are for the MAC-CE CLI reporting. For example, referring to FIG. 14, the DCI transmitted at 1406 may be associated with trigger states and the RRC communication at 1408 may indicate a subset of the trigger states that are for MAC-CE CLI reporting.

In some aspects, at 1606, the UE may receive a MAC-CE that indicates that a subset of a plurality of trigger states are for the MAC-CE CLI reporting, where the DCI may include an indication of one or more of the plurality of trigger states for the MAC-CE CLI reporting. For example, referring to FIG. 14, the UE 1402 may receive a MAC-CE transmitted by the base station 1404 at 1410, where the MAC-CE indicates trigger states that are for MAC-CE-CLI reporting. In another example, referring to FIG. 11, the second diagram 1104 depicts a MAC-CE sub-selection for CSI and CLI reporting.

In some aspects, one or more DCI field values in the DCI may indicate whether at least one of the MAC-CE CLI reporting or the SP CSI reporting is to be activated. For example, referring to FIG. 9, the other fields 912 may include values that indicate whether at least one of the MAC-CE CLI reporting or the SP CSI reporting is to be activated.

In some aspects, the DCI may be based on a RNTI that triggers the MAC-CE CLI reporting, where the RNTI may be equivalent to at least one other RNTI used for aperiodic CSI reporting. For example, referring to FIG. 14, the DCI transmitted at 1406 may be equivalent to a C-RNTI used for AP CSI reporting.

In some aspects, the DCI may be associated with a plurality of trigger states, where a subset of the plurality of trigger states may be for the MAC-CE CLI reporting. For example, referring to FIG. 8, the DCI 802 may be associated with aperiodic trigger states 810 and a subset of the trigger states (e.g., the aperiodic trigger state 808) may be for MAC-CE CLI reporting.

In some aspects, at 1608, the UE may receive a MAC-CE that indicates that a subset of a plurality of codepoints in the DCI are for the MAC-CE CLI reporting. For example, referring to FIG. 14, the UE 1402 may receive a MAC-CE transmitted by the base station 1404 at 1410, where the MAC-CE indicates that a subset of a plurality of codepoints are for MAC-CE CLI reporting. In another example, referring to FIG. 11, the second diagram 1104 depicts a MAC-CE sub-selection for CSI and CLI reporting.

In some aspects, at 1604, the UE may receive, prior to receive the DCI and via RRC communications, one or more CLI reporting configurations, where the one or more MAC-CE CLI reports may be based upon the one or more CLI reporting configurations. For example, referring to FIG. 14, the UE 1402 may receive CLI reporting configurations transmitted by the base station 1404 at 1408 and the L2 CLI report(s) transmitted by the UE 1402 at 1414 may be based upon the CLI reporting configurations.

In some aspects, at 1624, the UE may receive a second DCI for deactivating a first MAC-CE CLI report or for activating a second MAC-CE CLI report. For example, referring to FIG. 14, the UE 1402 may receive DCI transmitted by the base station 1404 at 1406 and the DCI may deactivate a first MAC-CE CLI report or activate a second MAC-CE CLI report.

In some aspects, the DCI includes one or more fields that include one or more parameters for the MAC-CE CLI reporting and at 1620, the UE may update the MAC-CE CLI reporting based upon the one or more parameters. For example, referring to FIGS. 8 and 9, the other fields 814 in the DCI 802 and/or the other fields 912 in the DCI 902 may include parameters for CLI reporting. For example, referring to FIG. 14, at 1422, the UE may apply a parameter adaptation included in DCI transmitted by the base station 1404 at 1420.

In some aspects, the one or more parameters may include one or more of: an indication for wide-band reporting or sub-band reporting, a sub-selection of one or more sub-bands that are to be reported, an update of a CLI reporting threshold, or a QCL-D update of a measurement resource. For example, referring to FIG. 14, the UE 1402 may receive a parameter adaptation transmitted by the base station 1404, and the parameter adaptation may include one or more of an indication for wide-band reporting or sub-band reporting, a sub-selection of one or more sub-bands that are to be reported, an update of a CLI reporting threshold, or a QCL-D update of a measurement resource.

In some aspects, the one or more CLI reporting configurations may include a list that includes the one or more parameters, where the DCI may indicate a parameter in the one or more parameters or the list indicates a default parameter. For example, referring to FIG. 14, the UE 1402 may receive a CLI reporting configuration that includes an adaptable parameter list via RRC communication at 1408. For example, the UE 1402 may receive DCI transmitted by the base station 1404 at 1406, where the DCI may indicate a parameter in the adaptable parameter list.

In some aspects, updating the MAC-CE CLI reporting based upon the one or more parameters occurs at a time that may be based upon one of: a first number of symbols from the DCI, a second number of slots from a slot that carries the DCI, or a SCS and a type of the one or more parameters. For example, referring to FIG. 12, the first diagram 1202, the second diagram 1204, and the third diagram 1206 respectively illustrate updating MAC-CE CLI reporting based upon a time that may be based upon one of: a first number of symbols from the DCI, a second number of slots from a slot that carries the DCI, or a SCS and a type of the one or more parameters.

In some aspects, at 1614, the UE may receive a MAC-CE for activating one or more CLI measurement resources for the one or more MAC-CE CLI reports. For example, referring to FIG. 14, the UE 1402 may receive a MAC-CE transmitted by the base station 1404 at 1410, where the MAC-CE is for activating one or more CLI measurement resources. For example, at 1428, the UE 1402 may activate CLI measurement resource(s).

In some aspects, at 1616, the UE may perform measurements on the one or more CLI measurement resources based upon the MAC-CE for activating the one or more CLI measurement resources. For example, referring to FIG. 14, at 1412, the UE 1402 may perform measurements on CLI measurement resource(s) activated at 1428.

In some aspects, the DCI further may activate one or more CLI measurement resources for the one or more MAC-CE CLI reports. For example, referring to FIG. 14, the UE 1402 may receive the DCI transmitted by the base station 1404 at 1406, where the DCI activates the CLI measurement resources(s) at 1428.

In some aspects, the one or more CLI measurement resources may be shared between the one or more MAC-CE CLI reports or each of the one or more CLI measurement resources may be utilized by a different MAC-CE CLI report in the one or more MAC-CE CLI reports. For example, referring to FIG. 14, the CLI measurement resources activated at 1428 may be shared or not be shared by different L2 CLI reports. In another example, referring to FIG. 13, the diagram 1300 illustrates sharing of CLI measurement resources.

Figure 17:
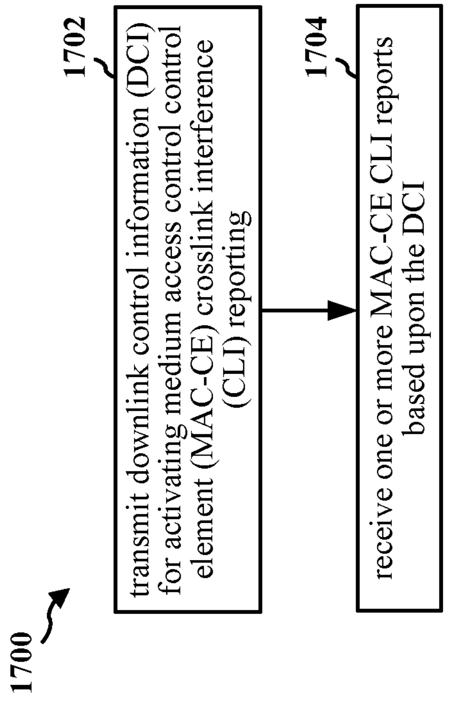
FIG. 17 is a flowchart of a method of wireless communication.

FIG. 17 is a flow chart 1700 of a method of wireless communication. The method may be performed by a network node (e.g., the base station 102, the base station 310, the base station 1404, the network entity 1902). In an example, the method may be performed by the report receiving component 199 described above. The method may be associated with various advantages for the network node, such as faster reception of a MAC-CE CLI report.

At 1702, the network node transmits DCI for activating MAC-CE CLI reporting. For example, referring to FIG. 14, at 1406, the base station 1404 may transmit DCI for activating L2 CLI reporting. In another example, the DCI may be the DCI 802 or the DCI 902 in FIGS. 8 and 9, respectively.

At 1704, the network node receives one or more MAC-CE CLI reports based upon the DCI. For example, referring to FIG. 14, the base station 1404 may receive one or more L2 CLI reports transmitted by the UE 1402 at 1414.

Figure 18:
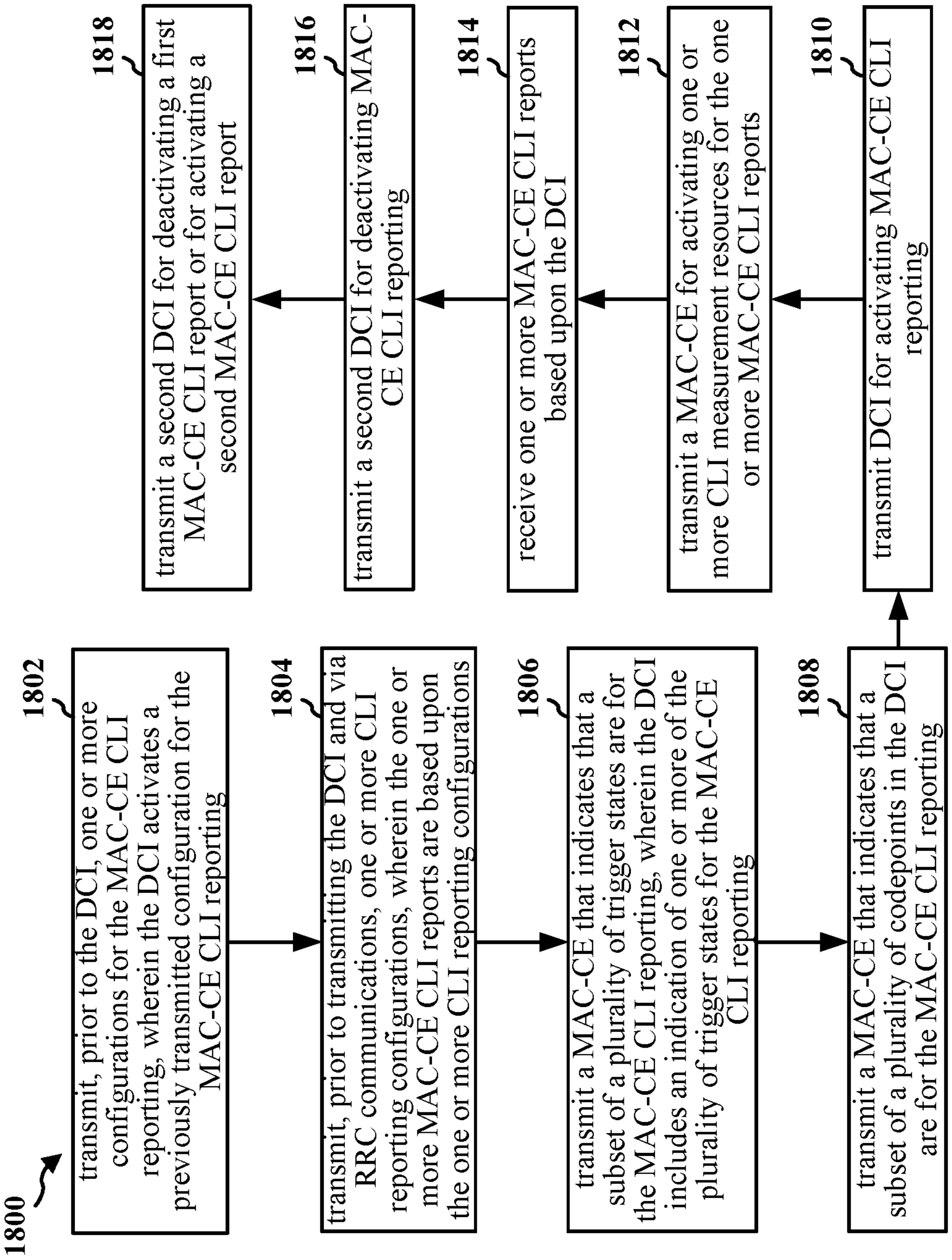
FIG. 18 is a flowchart of a method of wireless communication.

FIG. 18 is a flow chart 1800 of a method of wireless communication. The method may be performed by a network node (e.g., the base station 102, the base station 310, the base station 1404, the network entity 1902. In an example, the method (including the various configurations described below) may be performed by the report receiving component 199 described above. The method may be associated with various advantages for the network node, such as faster reception of a MAC-CE CLI report.

At 1810, the network node transmits DCI for activating MAC-CE CLI reporting. For example, referring to FIG. 14, at 1406, the base station 1404 may transmit DCI for activating L2 CLI reporting. In another example, the DCI may be the DCI 802 or the DCI 902 in FIGS. 8 and 9, respectively.

At 1814, the network node receives one or more MAC-CE CLI reports based upon the DCI. For example, referring to FIG. 14, the base station 1404 may receive one or more L2 CLI reports transmitted by the UE 1402 at 1414.

In some aspects, at 1802, the network node may transmit, prior to the DCI, one or more configurations for the MAC-CE CLI reporting, where the DCI may activate a previously transmitted configuration for the MAC-CE CLI reporting. For example, referring to FIG. 14, at 1408, the base station 1404 may transmit an RRC communication that includes configurations for MAC-CE CLI reporting and the DCI transmitted at 1406 may activate the configurations.

In some aspects, one or more measurements may be performed based upon the DCI, where the one or more MAC-CE CLI reports may include the one or more measurements. For example, referring to FIG. 14, at 1412, one or more measurements are performed based upon the DCI transmitted at 1406.

In some aspects, at 1816, the network node may transmit a second DCI for deactivating MAC-CE CLI reporting. For example, referring to FIG. 14, at 1416, the base station 1404 may transmit a DCI that deactivates MAC-CE CLI reporting. In an example, the DCI may be the DCI 802 or the DCI 902 in FIGS. 8 and 9, respectively.

In some aspects, the DCI may be based on a RNTI associated with the MAC-CE CLI reporting, where the RNTI may be different than at least one other RNTI used for AP CSI reporting, where a CSI request field in the DCI may indicate that the MAC-CE CLI reporting is to be activated, and where a trigger state configured in RRC may include a mapping to a L2 CLI report setting. For example, referring to FIG. 14, the DCI transmitted at 1406 may be associated with a new RNTI. In another example, referring to FIG. 8, the CSI request field 804 may indicate that MAC-CE CLI reporting is to be activated. In a further example, referring to FIG. 8, the aperiodic trigger state 808 may include a mapping to a CSI report setting ID 812A.

In some aspects, the DCI may be based on a RNTI that triggers the MAC-CE CLI reporting, where the RNTI may be equivalent to at least one other RNTI used for semi-persistent CSI reporting. For example, referring to FIG. 14, the DCI transmitted at 1406 may be associated with a SP-CSI RNTI. In another example, referring to FIG. 9, the SP-CSI RNTI may be associated with the DCI 902.

In some aspects, the DCI may be associated with a plurality of trigger states, where a subset of the plurality of trigger states may be for the MAC-CE CLI reporting. For example, referring to FIG. 14, the DCI transmitted at 1406 may be associated with trigger states and the RRC communication at 1408 may indicate a subset of the trigger states that are for MAC-CE CLI reporting.

In some aspects, at 1806, the network node may transmit a MAC-CE that indicates that a subset of a plurality of trigger states may be for the MAC-CE CLI reporting, where the DCI may include an indication of one or more of the plurality of trigger states for the MAC-CE CLI reporting. For example, referring to FIG. 14, at 1410, the base station may transmit a MAC-CE that indicates trigger states that are for MAC-CE-CLI reporting. In another example, referring to FIG. 11, the second diagram 1104 depicts a MAC-CE sub-selection for CSI and CLI reporting.

In some aspects, one or more DCI field values in the DCI may indicate whether at least one of the MAC-CE CLI reporting or the semi-persistent CSI reporting is to be activated. For example, referring to FIG. 9, the other fields 912 may include values that indicate whether at least one of the MAC-CE CLI reporting or the semi-persistent CSI reporting is to be activated.

In some aspects, the DCI may be based on a RNTI that triggers the MAC-CE CLI reporting, where the RNTI may be equivalent to at least one other RNTI used for aperiodic CSI reporting. For example, referring to FIG. 14, the DCI transmitted at 1406 may be equivalent to a C-RNTI used for aperiodic CSI reporting.

In some aspects, the DCI may be associated with a plurality of trigger states, where a subset of the plurality of trigger states may be for the MAC-CE CLI reporting. For example, referring to FIG. 8, the DCI 802 may be associated with aperiodic trigger states 810 and a subset of the trigger states (e.g., the aperiodic trigger state 808) may be for MAC-CE CLI reporting.

In some aspects, at 1808, the network node may transmit a MAC-CE that indicates that a subset of a plurality of codepoints in the DCI may be for the MAC-CE CLI reporting. For example, referring to FIG. 14, at 1410, the base station 1404 may transmit a MAC-CE that indicates that a subset of a plurality of codepoints are for MAC-CE CLI reporting. In another example, referring to FIG. 11, the second diagram 1104 depicts a MAC-CE sub-selection for CSI and CLI reporting.

In some aspects, at 1804, the network node may transmit, prior to transmit the DCI and via RRC communications, one or more CLI reporting configurations, where the one or more MAC-CE CLI reports may be based upon the one or more CLI reporting configurations. For example, referring to FIG. 14, at 1408, the base station 1404 may transmit CLI reporting configurations via an RRC communication and the L2 CLI report(s) received by the base station 1404 may be based upon the CLI reporting configurations.

In some aspects, at 1818, the network node may transmit a second DCI for deactivating a first MAC-CE CLI report or for activating a second MAC-CE CLI report. For example, referring to FIG. 14, at 1406, the base station 1404 may transmit DCI that deactivates a first MAC-CE CLI report or that activates a second MAC-CE CLI report.

In some aspects, the DCI may include one or more fields that include one or more parameters for the MAC-CE CLI reporting, where the MAC-CE CLI reporting may be updated based upon the one or more parameters. For example, referring to FIGS. 8 and 9, the other fields 814 in the DCI 802 and/or the other fields 912 in the DCI 902 may include parameters for CLI reporting. For example, referring to FIG. 14, at 1420, the base station 1404 may transmit a parameter adaptation and at 1422, the parameter adaptation may be applied.

In some aspects, the one or more parameters may include one or more of: an indication for wide-band reporting or sub-band reporting, a sub-selection of one or more sub-bands that are to be reported, an update of a CLI reporting threshold, or a QCL-D update of a measurement resource. For example, referring to FIG. 14, at 1420, the base station 1404 may transmit a parameter adaptation that may include one or more of an indication for wide-band reporting or sub-band reporting, a sub-selection of one or more sub-bands that are to be reported, an update of a CLI reporting threshold, or a QCL-D update of a measurement resource.

In some aspects, the one or more CLI reporting configurations may include a list that includes the one or more parameters, where the DCI may indicate a parameter in the one or more parameters or the list indicates a default parameter. For example, referring to FIG. 14, at 1408, the base station 1404 may transmit, via RRC communication, a CLI reporting configuration includes an adaptable parameter list.

In some aspects, the MAC-CE CLI reporting may be updated based upon the one or more parameters at a time that is based upon one of: a first number of symbols from the DCI, a second number of slots from a slot that carries the DCI, or a SCS and a type of the one or more parameters. For example, referring to FIG. 12, the first diagram 1202, the second diagram 1204, and the third diagram 1206 respectively illustrate updating MAC-CE CLI reporting based upon a time that may be based upon one of: a first number of symbols from the DCI, a second number of slots from a slot that carries the DCI, or a SCS and a type of the one or more parameters.

In some aspects, at 1812, the network node may transmit a MAC-CE for activating one or more CLI measurement resources for the one or more MAC-CE CLI reports. For example, referring to FIG. 14, at 1410, the base station 1404 may transmit a MAC-CE, where the MAC-CE is for activating one or more CLI measurement resources. For example, at 1428, a CLI measurement resource may be activated.

In some aspects, the DCI may further activate one or more CLI measurement resources for the one or more MAC-CE CLI reports. For example, referring to FIG. 14, the DCI transmitted at 1406 may activate one or more CLI measurement resources for the one or more MAC-CE CLI reports.

In some aspects, the one or more CLI measurement resources may be shared between the one or more MAC-CE CLI reports or each of the one or more CLI measurement resources may be utilized by a different MAC-CE CLI report in the one or more MAC-CE CLI reports. For example, referring to FIG. 14, the CLI measurement resources activated at 1428 may be shared or not be shared by different L2 CLI reports. In another example, referring to FIG. 13, the diagram 1300 illustrates sharing of CLI measurement resources.

Figure 19:
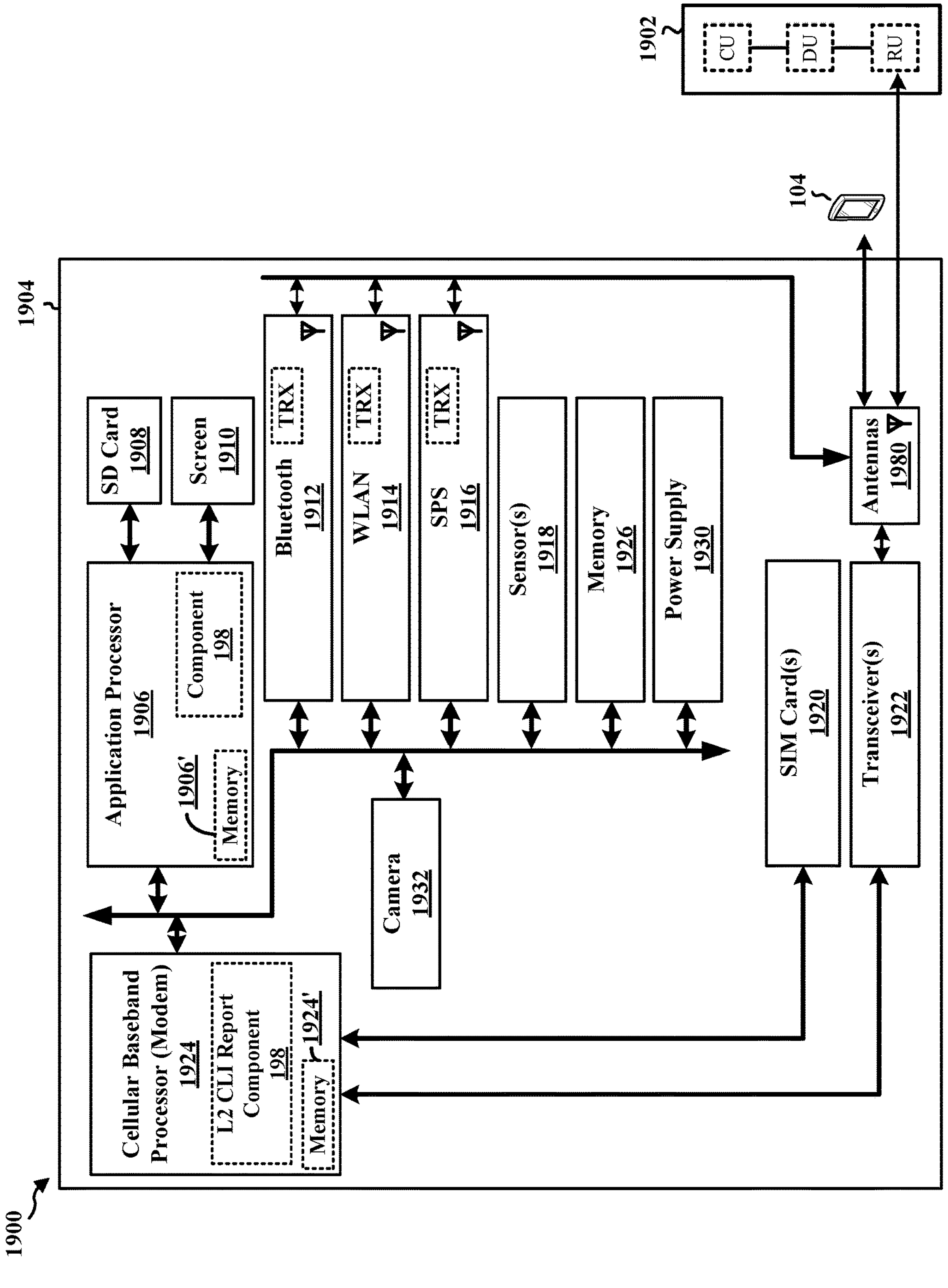
FIG. 19 is a diagram illustrating an example of a hardware implementation for an example apparatus and/or network entity.

FIG. 19 is a diagram 1900 illustrating an example of a hardware implementation for an apparatus 1904. The apparatus 1904 may be a UE, a component of a UE, or may implement UE functionality. In some aspects, the apparatus 1904 may include a cellular baseband processor 1924 (also referred to as a modem) coupled to one or more transceivers 1922 (e.g., cellular RF transceiver). The cellular baseband processor 1924 may include on-chip memory 1924'. In some aspects, the apparatus 1904 may further include one or more subscriber identity modules (SIM) cards 1920 and an application processor 1906 coupled to a secure digital (SD) card 1908 and a screen 1910. The application processor 1906 may include on-chip memory 1906'. In some aspects, the apparatus 1904 may further include a Bluetooth module 1912, a WLAN module 1914, an SPS module 1916 (e.g., GNSS module), one or more sensor modules 1918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1926, a power supply 1930, and/or a camera 1932. The Bluetooth module 1912, the WLAN module 1914, and the SPS module 1916 may include an on-chip transceiver (TRX) (or in some cases, just a receiver (RX)). The Bluetooth module 1912, the WLAN module 1914, and the SPS module 1916 may include their own dedicated antennas and/or utilize the antennas 1980 for communication. The cellular baseband processor 1924 communicates through the transceiver(s) 1922 via one or more antennas 1980 with the UE 104 and/or with an RU associated with a network entity 1902. The cellular baseband processor 1924 and the application processor 1906 may each include a computer-readable medium/memory 1924', 1906', respectively. The additional memory modules 1926 may also be considered a computer-readable medium/memory. Each computer-readable medium/memory 1924', 1906', 1926 may be non-transitory. The cellular baseband processor 1924 and the application processor 1906 are each responsible for general processing, including the execution of software stored on the computer-readable medium/memory. The software, when executed by the cellular baseband processor 1924/application processor 1906, causes the cellular baseband processor 1924/application processor 1906 to perform the various functions described supra. The computer-readable medium/memory may also be used for storing data that is manipulated by the cellular baseband processor 1924/application processor 1906 when executing software. The cellular baseband processor 1924/application processor 1906 may be a component of the UE 350 and may include the memory 360 and/or at least one of the TX processor 368, the RX processor 356, and the controller/processor 359. In one configuration, the apparatus 1904 may be a processor chip (modem and/or application) and include just the cellular baseband processor 1924 and/or the application processor 1906, and in another configuration, the apparatus 1904 may be the entire UE (e.g., see 350 of FIG. 3) and include the additional modules of the apparatus 1904.

As discussed supra, the L2 CLI report component 198 is configured to receive DCI for activating MAC-CE CLI reporting and transmit one or more MAC-CE CLI reports based upon the DCI. The L2 CLI report component 198 may be further configured to perform any of the aspects described in connection with FIGS. 8-14 and/or performed by the UE in FIG. 14. The L2 CLI report component 198 may be within the cellular baseband processor 1924, the application processor 1906, or both the cellular baseband processor 1924 and the application processor 1906. The L2 CLI report component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1904 may include a variety of components configured for various functions. In one configuration, the apparatus 1904, and in particular the cellular baseband processor 1924 and/or the application processor 1906, includes means for receiving DCI for activating MAC-CE CLI reporting and means for transmitting one or more MAC-CE CLI reports based upon the DCI. The apparatus 1904 may further include means to perform any of the aspects described in connection with FIGS. 8-14 and/or performed by the UE in FIG. 14. The means may be the L2 CLI report component 198 of the apparatus 1904 configured to perform the functions recited by the means. As described supra, the apparatus 1904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 20:
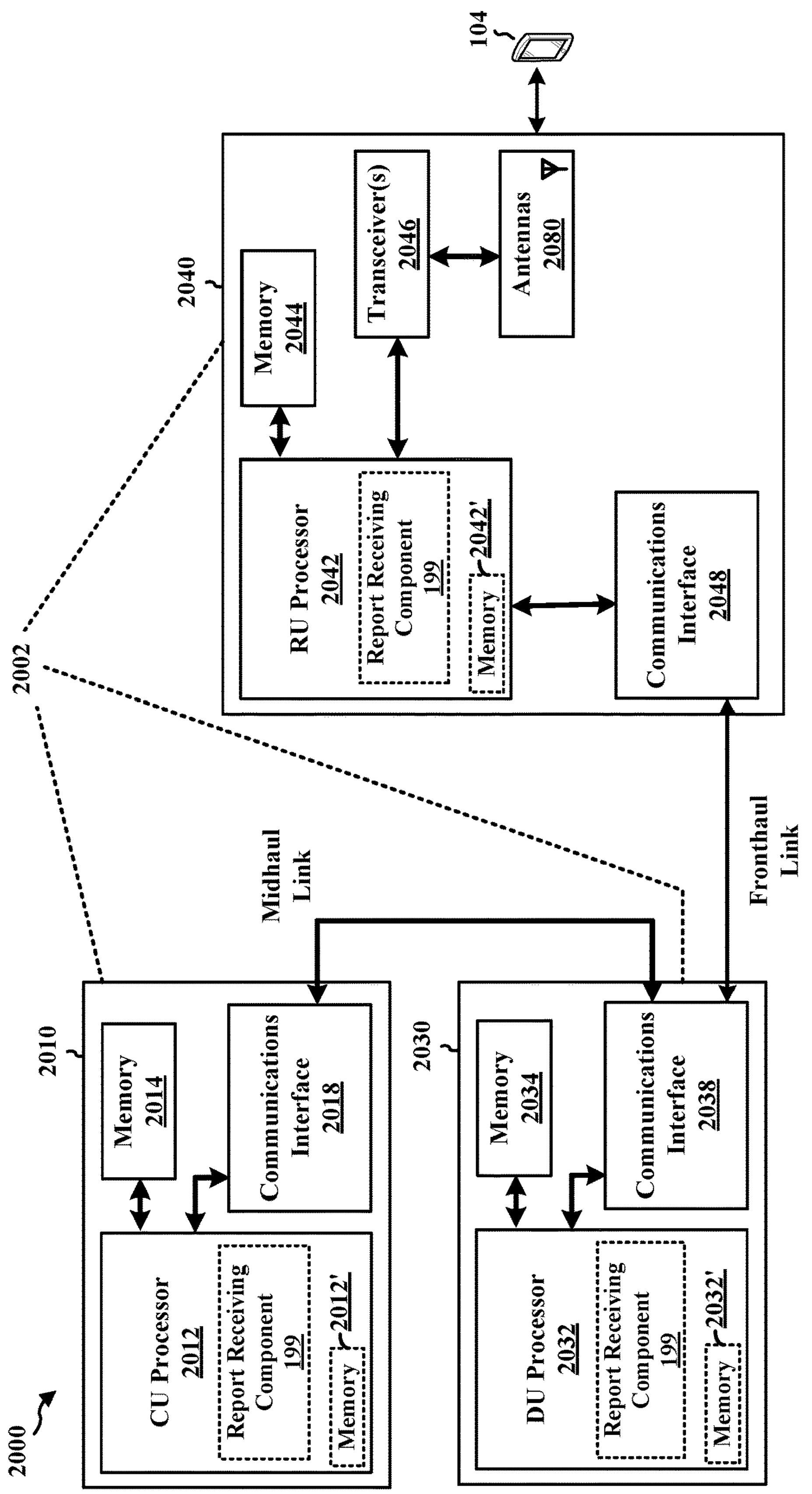
FIG. 20 is a diagram illustrating an example of a hardware implementation for an example network entity.

FIG. 20 is a diagram 2000 illustrating an example of a hardware implementation for a network entity 2002. The network entity 2002 may be a BS, a component of a BS, or may implement BS functionality. The network entity 2002 may include at least one of a CU 2010, a DU 2030, or an RU 2040. For example, depending on the layer functionality handled by the report receiving component 199, the network entity 2002 may include the CU 2010; both the CU 2010 and the DU 2030; each of the CU 2010, the DU 2030, and the RU 2040; the DU 2030; both the DU 2030 and the RU 2040; or the RU 2040. The CU 2010 may include a CU processor 2012. The CU processor 2012 may include on-chip memory 2012'. In some aspects, the CU 2010 may further include additional memory modules 2014 and a communications interface 2018. The CU 2010 communicates with the DU 2030 through a midhaul link, such as an F1 interface. The DU 2030 may include a DU processor 2032. The DU processor 2032 may include on-chip memory 2032'. In some aspects, the DU 2030 may further include additional memory modules 2034 and a communications interface 2038. The DU 2030 communicates with the RU 2040 through a fronthaul link. The RU 2040 may include an RU processor 2042. The RU processor 2042 may include on-chip memory 2042'. In some aspects, the RU 2040 may further include additional memory modules 2044, one or more transceivers 2046, antennas 2080, and a communications interface 2048. The RU 2040 communicates with the UE 104. The on-chip memory 2012', 2032', 2042' and the additional memory modules 2014, 2034, 2044 may each be considered a computer-readable medium/memory. Each computer-readable medium/memory may be non-transitory. Each of the processors 2012, 2032, 2042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the report receiving component 199 is configured to transmit DCI for activating MAC-CE CLI reporting and receive one or more MAC-CE CLI reports based upon the DCI. The report receiving component 199 may be further configured to perform any of the aspects described in connection with FIGS. 8-14 and/or performed by the base station in FIG. 14. The report receiving component 199 may be within one or more processors of one or more of the CU 2010, DU 2030, and the RU 2040. The report receiving component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2002 may include a variety of components configured for various functions. In one configuration, the network entity 2002 includes means for transmitting DCI for activating MAC-CE CLI reporting and means for receiving one or more MAC-CE CLI reports based upon the DCI. The network entity 2002 may further include means to perform any of the aspects described in connection with FIGS. 8-14 and/or performed by the base station in FIG. 14. The means may be the report receiving component 199 of the network entity 2002 configured to perform the functions recited by the means. As described supra, the network entity 2002 may include the TX processor 316, the RX processor 370, and the controller/processor 375. As such, in one configuration, the means may be the TX processor 316, the RX processor 370, and/or the controller/processor 375 configured to perform the functions recited by the means.

A first UE (e.g., an interfered UE) may experience CLI from a second UE (e.g., an interfering UE) when the first UE transmits and receives data on the same frequency band. CLI may impact communications reliability at the first UE. A need exists for efficient triggering of CLI reporting by a UE such that a base station and/or the UE can adjust transmission/reception parameters to mitigate the effect of CLI.

To address these issues, L1 (DCI-based) activation and deactivation of L2 (MAC-CE) based CLI reporting is disclosed herein. The L1 activation/deactivation may be based upon DCI associated with RNTIs used for AP or SP CSI reporting or based upon a new RNTI. L1 activation/deactivation of L2 CLI reporting may be faster in comparison to L2 activation of L2 CLI reporting. Also disclosed herein are techniques for parameter adaptation (e.g., adaptation of wideband vs. sub-band, adaptation of sub-bands to be reported, other CLI reporting parameters such as periodicity, etc.) of L2 CLI reporting.

In an example, a UE receives DCI for activating MAC-CE CLI reporting. The UE transmits one or more MAC-CE CLI reports based upon the DCI. As the MAC-CE CLI reporting is triggered by DCI, activation of the MAC-CE CLI reporting may be faster in comparison to activation of MAC-CE CLI reporting by L2 signaling. As the UE may be able to more rapidly transmit MAC-CE CLI reports to a base station via activation of the MAC-CE CLI reporting by the DCI, the base station and/or the UE may be able to more rapidly adjust transmission/reception parameters to mitigate the effect of CLI.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving downlink control information (DCI) for activating medium access control control element (MAC-CE) crosslink interference (CLI) reporting; and transmitting one or more MAC-CE CLI reports based upon the DCI.

Aspect 2 is the method of aspect 1, further including: receiving, prior to the DCI, one or more configurations for the MAC-CE CLI reporting, where the DCI activates a previously received configuration for the MAC-CE CLI reporting.

Aspect 3 is the method of any of aspects 1-2, further including: performing, prior to transmitting the one or more MAC-CE CLI reports, one or more measurements based upon the DCI, where the one or more MAC-CE CLI reports include the one or more measurements.

Aspect 4 is the method of any of aspects 1-3, further including: receiving a second DCI for deactivating the MAC-CE CLI reporting.

Aspect 5 is the method of any of aspects 1-4, where the DCI is based on a radio-network temporary identifier (RNTI) associated with the MAC-CE CLI reporting, where the RNTI is different than at least one other RNTI used for aperiodic channel state information (AP CSI) reporting, where a channel-state information (CSI) request field in the DCI indicates that the MAC-CE CLI reporting is to be activated, and where a trigger state configured in radio resource control (RRC) includes a mapping to a L2 CLI report setting.

Aspect 6 is the method of any of aspects 1-4, where the DCI is based on a radio-network temporary identifier (RNTI) that triggers the MAC-CE CLI reporting, where the RNTI is equivalent to at least one other RNTI used for semi-persistent channel state information (SP CSI) reporting.

Aspect 7 is the method of aspect 6, where the DCI is associated with a plurality of trigger states, where a subset of the plurality of trigger states are for the MAC-CE CLI reporting.

Aspect 8 is the method of aspect 6, further including: receiving a MAC-CE that indicates that a subset of a plurality of trigger states are for the MAC-CE CLI reporting, where the DCI includes an indication of one or more of the plurality of trigger states for the MAC-CE CLI reporting.

Aspect 9 is the method of aspect 6, where one or more DCI field values in the DCI indicate whether at least one of the MAC-CE CLI reporting or the SP CSI reporting is to be activated.

Aspect 10 is the method of any of aspects 1-4, where the DCI is based on a radio-network temporary identifier (RNTI) that triggers the MAC-CE CLI reporting, where the RNTI is equivalent to at least one other RNTI used for aperiodic channel state information (AP CSI) reporting.

Aspect 11 is the method of aspect 10, where the DCI is associated with a plurality of trigger states, where a subset of the plurality of trigger states are for the MAC-CE CLI reporting.

Aspect 12 is the method of any of aspects 10-11, further including: receiving a MAC-CE that indicates that a subset of a plurality of codepoints in the DCI are for the MAC-CE CLI reporting.

Aspect 13 is the method of any of aspects 1-12, further including: receiving, prior to receiving the DCI and via radio resource control (RRC) communications, one or more CLI reporting configurations, where the one or more MAC-CE CLI reports are based upon the one or more CLI reporting configurations.

Aspect 14 is the method of any of aspects 1-3 and 5-13, further including: receiving a second DCI for deactivating a first MAC-CE CLI report or for activating a second MAC-CE CLI report.

Aspect 15 is the method of any of aspects 13-14, where the DCI includes one or more fields that include one or more parameters for the MAC-CE CLI reporting, the method further including: updating the MAC-CE CLI reporting based upon the one or more parameters.

Aspect 16 is the method of aspect 15, where the one or more parameters include one or more of: an indication for wide-band reporting or sub-band reporting, a sub-selection of one or more sub-bands that are to be reported, an update of a CLI reporting threshold, or a quasi co-location type D (QCL-D) update of a measurement resource.

Aspect 17 is the method of any of aspects 15-16, where the one or more CLI reporting configurations include a list that includes the one or more parameters, where the DCI indicates a parameter in the one or more parameters or the list indicates a default parameter.

Aspect 18 is the method of any of aspects 15-17, where updating the MAC-CE CLI reporting based upon the one or more parameters occurs at a time that is based upon one of: a first number of symbols from the DCI, a second number of slots from a slot that carries the DCI, or a subcarrier spacing (SCS) and a type of the one or more parameters.

Aspect 19 is the method of any of aspects 1-18, further including: receiving a MAC-CE for activating one or more CLI measurement resources for the one or more MAC-CE CLI reports; and performing measurements on the one or more CLI measurement resources based upon the MAC-CE for activating the one or more CLI measurement resources.

Aspect 20 is the method of any of aspects 1-18, where the DCI further activates one or more CLI measurement resources for the one or more MAC-CE CLI reports.

Aspect 21 is the method of aspect 20, where the one or more CLI measurement resources are shared between the one or more MAC-CE CLI reports or each of the one or more CLI measurement resources is utilized by a different MAC-CE CLI report in the one or more MAC-CE CLI reports.

Aspect 22 is an apparatus for wireless communication at a user equipment (UE) including a memory and at least one processor coupled to the memory and based at least in part on information stored in the memory, the at least one processor is configured to perform a method in accordance with any of aspects 1-21.

Aspect 23 is an apparatus for wireless communications, including means for performing a method in accordance with any of aspects 1-21.

Aspect 24 is the apparatus of aspect 22 or 23 further including at least one transceiver configured to receive the DCI for activating the MAC-CE CLI reporting and transmit the one or more MAC-CE CLI reports based upon the DCI.

Aspect 25 is a non-transitory computer-readable medium including instructions that, when executed by an apparatus, cause the apparatus to perform a method in accordance with any of aspects 1-21.

Aspect 26 is a method of wireless communication at a network node, including: transmitting downlink control information (DCI) for activating medium access control control element (MAC-CE) crosslink interference (CLI) reporting; and receiving one or more MAC-CE CLI reports based upon the DCI.

Aspect 27 is the method of aspect 26, further including: transmitting, prior to the DCI, one or more configurations for the MAC-CE CLI reporting, where the DCI activates a previously transmitted configuration for the MAC-CE CLI reporting.

Aspect 28 is the method of any of aspects 26-27, where one or more measurements are performed based upon the DCI, where the one or more MAC-CE CLI reports include the one or more measurements.

Aspect 29 is the method of any of aspects 26-28, further including: transmitting a second DCI for deactivating the MAC-CE CLI reporting.

Aspect 30 is the method of any of aspects 26-29, where the DCI is based on a radio-network temporary identifier (RNTI) associated with the MAC-CE CLI reporting, where the RNTI is different than at least one other RNTI used for aperiodic channel state information (AP CSI) reporting, where a channel-state information (CSI) request field in the DCI indicates that the MAC-CE CLI reporting is to be activated, and where a trigger state configured in radio resource control (RRC) includes a mapping to a L2 CLI report setting.

Aspect 31 is the method of any of aspects 26-29, where the DCI is based on a radio-network temporary identifier (RNTI) that triggers the MAC-CE CLI reporting, where the RNTI is equivalent to at least one other RNTI used for semi-persistent channel state information (SP CSI) reporting.

Aspect 32 is the method of aspect 31, where the DCI is associated with a plurality of trigger states, where a subset of the plurality of trigger states are for the MAC-CE CLI reporting.

Aspect 33 is the method of aspect 31, further including: transmitting a MAC-CE that indicates that a subset of a plurality of trigger states are for the MAC-CE CLI reporting, where the DCI includes an indication of one or more of the plurality of trigger states for the MAC-CE CLI reporting.

Aspect 34 is the method of aspect 31, where one or more DCI field values in the DCI indicate whether at least one of the MAC-CE CLI reporting or the SP CSI reporting is to be activated.

Aspect 35 is the method of any of aspects 26-29, where the DCI is based on a radio-network temporary identifier (RNTI) that triggers the MAC-CE CLI reporting, where the RNTI is equivalent to at least one other RNTI used for aperiodic channel state information (AP CSI) reporting.

Aspect 36 is the method of aspect 35, where the DCI is associated with a plurality of trigger states, where a subset of the plurality of trigger states are for the MAC-CE CLI reporting.

Aspect 37 is the method of any of aspects 35-36, further including: transmitting a MAC-CE that indicates that a subset of a plurality of codepoints in the DCI are for the MAC-CE CLI reporting.

Aspect 38 is the method of any of aspects 26-37, further including: transmitting, prior to transmitting the DCI and via radio resource control (RRC) communications, one or more CLI reporting configurations, where the one or more MAC-CE CLI reports are based upon the one or more CLI reporting configurations.

Aspect 39 is the method of any of aspects 26-28 and 30-38, further including: transmitting a second DCI for deactivating a first MAC-CE CLI report or for activating a second MAC-CE CLI report.

Aspect 40 is the method of any of aspects 38-39, where the DCI includes one or more fields that include one or more parameters for the MAC-CE CLI reporting, where the MAC-CE CLI reporting is updated based upon the one or more parameters.

Aspect 41 is the method of aspect 40, where the one or more parameters include one or more of: an indication for wide-band reporting or sub-band reporting, a sub-selection of one or more sub-bands that are to be reported, an update of a CLI reporting threshold, or a quasi co-location type D (QCL-D) update of a measurement resource.

Aspect 42 is the method of any of aspects 40-41, where the one or more CLI reporting configurations include a list that includes the one or more parameters, where the DCI indicates a parameter in the one or more parameters or the list indicates a default parameter.

Aspect 43 is the method of any of aspects 40-42, where the MAC-CE CLI reporting is updated based upon the one or more parameters at a time that is based upon one of: a first number of symbols from the DCI, a second number of slots from a slot that carries the DCI, or a subcarrier spacing (SCS) and a type of the one or more parameters.

Aspect 44 is the method of any of aspects 26-43, further including: transmitting a MAC-CE for activating one or more CLI measurement resources for the one or more MAC-CE CLI reports.

Aspect 45 is the method of any of aspects 26-43, where the DCI further activates one or more CLI measurement resources for the one or more MAC-CE CLI reports.

Aspect 46 is the method of aspect 45, where the one or more CLI measurement resources are shared between the one or more MAC-CE CLI reports or each of the one or more CLI measurement resources is utilized by a different MAC-CE CLI report in the one or more MAC-CE CLI reports.

Aspect 47 is an apparatus for wireless communication at a network node including a memory and at least one processor coupled to the memory and based at least in part on information stored in the memory, the at least one processor is configured to perform a method in accordance with any of aspects 26-46.

Aspect 48 is an apparatus for wireless communications, including means for performing a method in accordance with any of aspects 26-46.

Aspect 49 is the apparatus of aspect 47 or 48 further including at least one transceiver configured to transmit DCI for activating MAC-CE CLI reporting and receive one or more MAC-CE CLI reports based upon the DCI.

Aspect 50 is a non-transitory computer-readable medium including instructions that, when executed by an apparatus, cause the apparatus to perform a method in accordance with any of aspects 26-46.

What is claimed is:

1. An apparatus for wireless communication at a user equipment (UE), comprising:
memory; and
at least one processor coupled to the memory and, based at least in part on information stored in the memory, the at least one processor is configured to:
receive downlink control information (DCI) that indicates an activation of medium access control-control element (MAC-CE) crosslink interference (CLI) reporting based on measurement of semi-persistent CLI measurement resources; and
transmit, based on reception of the DCI, one or more MAC-CE CLI reports based on measurement of the semi-persistent CLI measurement resources.

2. The apparatus of claim 1, wherein the at least one processor is further configured to:
receive, prior to the DCI, one or more configurations for the MAC-CE CLI reporting, wherein the DCI activates a previously received configuration for the MAC-CE CLI reporting.

3. The apparatus of claim 1, wherein the at least one processor is further configured to:
perform, based on the activation in the DCI and prior to transmission of the one or more MAC-CE CLI reports, multiple measurements based upon the semi-persistent CLI measurement resources, wherein the one or more MAC-CE CLI reports include one or more measurements of the multiple measurements.

4. The apparatus of claim 1, wherein the at least one processor is further configured to:
receive a second DCI that indicates a deactivation the MAC-CE CLI reporting.

5. The apparatus of claim 1, wherein the DCI is based on a radio-network temporary identifier (RNTI) associated with the MAC-CE CLI reporting, wherein the RNTI is different than at least one other RNTI used for aperiodic channel state information (AP CSI) reporting, wherein a channel-state information (CSI) request field in the DCI indicates that the MAC-CE CLI reporting is to be activated, and wherein a trigger state configured in radio resource control (RRC) includes a mapping to a L2 CLI report setting.

6. The apparatus of claim 1, wherein the DCI is based on a radio-network temporary identifier (RNTI) that triggers the MAC-CE CLI reporting, wherein the RNTI is equivalent to at least one other RNTI used for semi-persistent channel state information (SP CSI) reporting.

7. The apparatus of claim 6, wherein the DCI is associated with a plurality of trigger states, wherein a subset of the plurality of trigger states is for the MAC-CE CLI reporting.

8. The apparatus of claim 6, wherein the at least one processor is further configured to:
receive a MAC-CE that indicates that a subset of a plurality of trigger states are for the MAC-CE CLI reporting, wherein the DCI includes an indication of one or more of the plurality of trigger states for the MAC-CE CLI reporting.

9. The apparatus of claim 6, wherein one or more DCI field values in the DCI indicate whether at least one of the MAC-CE CLI reporting or the SP CSI reporting is to be activated.

10. The apparatus of claim 1, wherein the DCI is based on a radio-network temporary identifier (RNTI) that triggers the MAC-CE CLI reporting, wherein the RNTI is equivalent to at least one other RNTI used for aperiodic channel state information (AP CSI) reporting.

11. The apparatus of claim 10, wherein the DCI is associated with a plurality of trigger states, wherein a subset of the plurality of trigger states are for the MAC-CE CLI reporting.

12. The apparatus of claim 10, wherein the at least one processor is further configured to:
receive a MAC-CE that indicates that a subset of a plurality of codepoints in the DCI are for the MAC-CE CLI reporting.

13. The apparatus of claim 1, wherein the at least one processor is further configured to:
receive, prior to receive the DCI and via radio resource control (RRC) communications, one or more CLI reporting configurations, wherein the one or more MAC-CE CLI reports are based upon the one or more CLI reporting configurations.

14. The apparatus of claim 13, wherein the at least one processor is further configured to:
receive a second DCI that deactivates a first MAC-CE CLI report or activates a second MAC-CE CLI report.

15. The apparatus of claim 13, wherein the DCI includes one or more fields that include one or more parameters for the MAC-CE CLI reporting, and wherein the at least one processor is further configured to:
update the MAC-CE CLI reporting based upon the one or more parameters.

16. The apparatus of claim 15, wherein the one or more parameters include one or more of:
an indication for wide-band reporting or sub-band reporting,
a sub-selection of one or more sub-bands that are to be reported,
an update of a CLI reporting threshold, or
a quasi co-location type D (QCL-D) update of a measurement resource.

17. The apparatus of claim 15, wherein the one or more CLI reporting configurations comprise a list that includes the one or more parameters, wherein the DCI indicates a parameter in the one or more parameters or the list indicates a default parameter.

18. The apparatus of claim 15, wherein update the MAC-CE CLI reporting based upon the one or more parameters occurs at a time that is based upon one of:
a first number of symbols from the DCI,
a second number of slots from a slot that carries the DCI, or
a subcarrier spacing (SCS) and a type of the one or more parameters.

19. The apparatus of claim 1, wherein the at least one processor is further configured to:
receive a MAC-CE that activates the semi-persistent CLI measurement resources for the one or more MAC-CE CLI reports; and
perform measurements on the one or more CLI measurement resources based upon the MAC-CE that activates the semi-persistent CLI measurement resources.

20. The apparatus of claim 1, wherein the DCI further activates the semi-persistent CLI measurement resources for the one or more MAC-CE CLI reports.

21. The apparatus of claim 20, wherein the semi-persistent CLI measurement resources are shared between the one or more MAC-CE CLI reports or each of the semi-persistent CLI measurement resources is utilized by a different MAC-CE CLI report in the one or more MAC-CE CLI reports.

22. The apparatus of claim 1, further comprising:

at least one transceiver coupled to the at least one processor and configured to receive the DCI and transmit the one or more MAC-CE CLI reports.

23. A method of wireless communication at a user equipment (UE), comprising:

receiving downlink control information (DCI) that indicates an activation of medium access control-control element (MAC-CE) crosslink interference (CLI) reporting based on measurement of semi-persistent CLI measurement resources; and transmitting, based on reception of the DCI, one or more MAC-CE CLI reports based on measurement of the semi-persistent CLI measurement resources.

24. An apparatus for wireless communication at a network node, comprising:

memory; and at least one processor coupled to the memory and, based at least in part on information stored in the memory, the at least one processor is configured to:

transmit downlink control information (DCI) that indicates an activation of medium access control-control element (MAC-CE) crosslink interference (CLI) reporting based on measurement of semi-persistent CLI measurement resources; and receive, in response to the DCI, one or more MAC-CE CLI reports based on the measurement of the semi-persistent CLI measurement resources.

25. The apparatus of claim 24, wherein the at least one processor is further configured to:

transmit, prior to the DCI, one or more configurations for the MAC-CE CLI reporting, wherein the DCI activates a previously transmitted configuration for the MAC-CE CLI reporting.

26. The apparatus of claim 24, wherein, based on the DCI, the one or more MAC-CE CLI reports are based on multiple measurements based upon the semi-persistent CLI measurement resources.

27. The apparatus of claim 24, wherein the at least one processor is further configured to:

transmit a second DCI that indicates a deactivation the MAC-CE CLI reporting.

28. The apparatus of claim 24, wherein the DCI is based on a radio-network temporary identifier (RNTI) associated with the MAC-CE CLI reporting, wherein the RNTI is different than at least one other RNTI used for aperiodic channel state information (AP CSI) reporting, wherein a channel-state information (CSI) request field in the DCI indicates that the MAC-CE CLI reporting is to be activated, and wherein a trigger state configured in radio resource control (RRC) includes a mapping to a L2 CLI report setting.

29. The apparatus of claim 24, further comprising: at least one transceiver coupled to the at least one processor and configured to transmit the DCI and receive the one or more MAC-CE CLI reports.

30. A method of wireless communication at a network node, comprising:

transmitting downlink control information (DCI) that indicates an activation of medium access control-control element (MAC-CE) crosslink interference (CLI) reporting based on measurement of semi-persistent CLI measurement resources; and receiving, in response to the DCI, one or more MAC-CE CLI reports based on the measurement of the semi-persistent CLI measurement resources.

* * * * *